United States Patent
O'Neill

(10) Patent No.: US 7,697,501 B2
(45) Date of Patent: *Apr. 13, 2010

(54) METHODS AND APPARATUS FOR SEPARATING HOME AGENT FUNCTIONALITY

(75) Inventor: Alan O'Neill, Henley Beach (AU)

(73) Assignee: Qualcomm Incorporated, San Diego, CA (US)

( * ) Notice: Subject to any disclaimer, the term of this patent is extended or adjusted under 35 U.S.C. 154(b) by 1398 days.

This patent is subject to a terminal disclaimer.

(21) Appl. No.: 10/838,613

(22) Filed: May 4, 2004

(65) Prior Publication Data

US 2005/0174984 A1 Aug. 11, 2005

Related U.S. Application Data

(60) Provisional application No. 60/542,467, filed on Feb. 6, 2004.

(51) Int. Cl.
*H04J 3/24* (2006.01)
*H04L 12/66* (2006.01)

(52) U.S. Cl. ........................ 370/349; 370/352

(58) Field of Classification Search ................. 370/349, 370/328, 331, 352, 355, 356, 357, 360, 395.31, 370/395.32
See application file for complete search history.

(56) References Cited

U.S. PATENT DOCUMENTS

| | | | |
|---|---|---|---|
| 4,679,244 A | 7/1987 | Kawasaki et al. |
| 4,833,701 A | 5/1989 | Comroe et al. |
| 4,901,307 A | 2/1990 | Gilhousen et al. |
| 5,056,109 A | 10/1991 | Gilhousen et al. |
| 5,095,529 A | 3/1992 | Comroe et al. |
| 5,128,938 A | 7/1992 | Borras |
| 5,200,952 A | 4/1993 | Bernstein et al. |

(Continued)

FOREIGN PATENT DOCUMENTS

EP 1244261 9/2002

(Continued)

OTHER PUBLICATIONS

C. Perkins, Editor "IP Mobility Support", Network Working Group, pp. 1-79 (Oct. 1996).

(Continued)

*Primary Examiner*—George Eng
*Assistant Examiner*—Michael Faragalla
(74) *Attorney, Agent, or Firm*—François A. Pelaez

(57) ABSTRACT

MIP Home Agent (HA) architectures are described that decompose, e.g., split, packet forwarding control functionality from actual data packet forwarding operations performed by a conventional MIP HA. This places MIP routing control in a node which is distinct from the tunnel end-points which perform packet forwarding operations to direct packets including a mobile's Home Address. Tunneling establishment and control functionality is implemented by what is referred to herein as decomposed HA (DHA) while data packet forwarding and redirection is performed, under the control of the DHA, by a tunneling agent (TA) node. The tunneling agent node serves as the data packet redirection node for a mobile as it moves from one location to another and may be located outside of a firewall used to protect the DHA. Tunnel endpoint nodes (Mobile Nodes and/or Access Nodes) send tunnel packets to the tunnel agent whilst directing control signaling packets to the DHA.

19 Claims, 15 Drawing Sheets

U.S. PATENT DOCUMENTS

| | | | |
|---|---|---|---|
| 5,210,787 A | 5/1993 | Hayes et al. |
| 5,229,992 A | 7/1993 | Jurkevich et al. |
| 5,247,516 A | 9/1993 | Bernstein et al. |
| 5,251,209 A | 10/1993 | Jurkevich et al. |
| 5,267,261 A | 11/1993 | Blakeney, II et al. |
| 5,325,432 A | 6/1994 | Gardeck et al. |
| 5,369,781 A | 11/1994 | Comroe et al. |
| 5,387,905 A | 2/1995 | Grube et al. |
| 5,420,909 A | 5/1995 | Ng et al. |
| 5,450,405 A | 9/1995 | Maher et al. |
| 5,461,645 A | 10/1995 | Ishii |
| 5,463,617 A | 10/1995 | Grube et al. |
| 5,465,391 A | 11/1995 | Toyryla |
| 5,473,605 A | 12/1995 | Grube et al. |
| 5,491,835 A | 2/1996 | Sasuta et al. |
| 5,511,232 A | 4/1996 | O'Dea et al. |
| 5,513,381 A | 4/1996 | Sasuta |
| 5,542,108 A | 7/1996 | Sasuta |
| 5,566,366 A | 10/1996 | Russo et al. |
| 5,572,528 A | 11/1996 | Shuen |
| 5,590,396 A | 12/1996 | Henry |
| 5,594,948 A | 1/1997 | Talarmo et al. |
| 5,625,882 A | 4/1997 | Vook et al. |
| 5,627,882 A | 5/1997 | Chien et al. |
| 5,634,197 A | 5/1997 | Paavonen |
| 5,806,007 A | 9/1998 | Raith et al. |
| 5,884,196 A | 3/1999 | Lekven et al. |
| 5,898,922 A | 4/1999 | Reininghaus |
| 5,901,362 A | 5/1999 | Cheung et al. |
| 5,903,559 A | 5/1999 | Acharya et al. |
| 5,987,323 A | 11/1999 | Huotari |
| 6,011,969 A | 1/2000 | Vargas et al. |
| 6,021,123 A | 2/2000 | Mimura |
| 6,021,326 A | 2/2000 | Nguyen |
| 6,055,236 A | 4/2000 | Nessett et al. |
| 6,078,575 A | 6/2000 | Dommety et al. |
| 6,092,111 A | 7/2000 | Scivier et al. |
| 6,134,226 A | 10/2000 | Reed et al. |
| 6,144,671 A | 11/2000 | Perinpanathan et al. |
| 6,160,798 A | 12/2000 | Reed et al. |
| 6,161,008 A | 12/2000 | Lee et al. |
| 6,195,705 B1 | 2/2001 | Leung |
| 6,225,888 B1 | 5/2001 | Juopperi |
| 6,256,300 B1 | 7/2001 | Ahmed et al. |
| 6,275,712 B1 | 8/2001 | Gray et al. |
| 6,308,080 B1 | 10/2001 | Burt et al. |
| 6,308,267 B1 | 10/2001 | Gremmelmaier |
| 6,353,616 B1 | 3/2002 | Elwalid et al. |
| 6,366,561 B1 | 4/2002 | Bender |
| 6,366,577 B1 | 4/2002 | Donovan |
| 6,400,703 B1 | 6/2002 | Park et al. |
| 6,400,722 B1 | 6/2002 | Chuah et al. |
| 6,434,134 B1 | 8/2002 | LaPorta et al. |
| 6,445,922 B1 | 9/2002 | Hiller et al. |
| 6,446,127 B1 | 9/2002 | Schuster et al. |
| 6,466,964 B1 | 10/2002 | Leung et al. |
| 6,477,150 B1 | 11/2002 | Maggenti et al. |
| 6,487,170 B1 | 11/2002 | Chen et al. |
| 6,487,407 B2 | 11/2002 | Goldberg et al. |
| 6,496,505 B2 | 12/2002 | La Porta et al. |
| 6,498,934 B1 | 12/2002 | Muller |
| 6,505,047 B1 | 1/2003 | Palkisto |
| 6,510,144 B1 | 1/2003 | Dommety et al. |
| 6,519,254 B1 | 2/2003 | Chuah et al. |
| 6,539,225 B1 | 3/2003 | Lee |
| 6,546,252 B1 | 4/2003 | Jetzek et al. |
| 6,563,919 B1 | 5/2003 | Aravamudhan et al. |
| 6,567,416 B1 | 5/2003 | Chuah |
| 6,567,664 B1 | 5/2003 | Bergenwall et al. |
| 6,571,095 B1 | 5/2003 | Koodli |
| 6,571,289 B1 | 5/2003 | Montenegro |
| 6,578,085 B1 | 6/2003 | Khalil et al. |
| 6,584,093 B1 | 6/2003 | Salama et al. |
| 6,611,506 B1 | 8/2003 | Huang et al. |
| 6,611,547 B1 | 8/2003 | Rauhala |
| 6,615,236 B2 | 9/2003 | Donovan et al. |
| 6,631,122 B1 | 10/2003 | Arunachalam et al. |
| 6,636,498 B1 | 10/2003 | Leung et al. |
| 6,650,901 B1 | 11/2003 | Schuster et al. |
| 6,654,363 B1 | 11/2003 | Li et al. |
| 6,678,735 B1 | 1/2004 | Orton et al. |
| 6,680,943 B1 | 1/2004 | Gibson et al. |
| 6,690,936 B1 | 2/2004 | Lundh |
| 6,738,362 B1 | 5/2004 | Xu et al. |
| 6,763,007 B1 | 7/2004 | La Porta et al. |
| 2001/0036164 A1 | 11/2001 | Kakemizu et al. |
| 2001/0041571 A1 | 11/2001 | Yuan et al. |
| 2001/0046223 A1 | 11/2001 | Malki et al. |
| 2002/0015396 A1 | 2/2002 | Jung |
| 2002/0018456 A1 | 2/2002 | Kakemizu et al. |
| 2002/0026527 A1 | 2/2002 | Das et al. |
| 2002/0068565 A1 | 6/2002 | Purnadi et al. |
| 2002/0071417 A1 | 6/2002 | Nakatsugawa et al. |
| 2002/0089958 A1 | 7/2002 | Feder et al. |
| 2002/0114469 A1 | 8/2002 | Faccin et al. |
| 2002/0136226 A1 | 9/2002 | Christoffel et al. |
| 2002/0161927 A1 | 10/2002 | Inoue et al. |
| 2002/0186679 A1 | 12/2002 | Nakatsugawa et al. |
| 2002/0191593 A1 | 12/2002 | O'Neill et al. |
| 2003/0012179 A1 | 1/2003 | Yano et al. |
| 2003/0051140 A1 | 3/2003 | Buddhikot et al. |
| 2003/0060199 A1 | 3/2003 | Khalil et al. |
| 2003/0117969 A1 | 6/2003 | Koo et al. |
| 2003/0137961 A1 | 7/2003 | Tsirtsis et al. |
| 2003/0137991 A1 | 7/2003 | Doshi et al. |
| 2003/0176188 A1 | 9/2003 | O'Neill |
| 2003/0228868 A1 | 12/2003 | Turanyi et al. |
| 2004/0047322 A1* | 3/2004 | O'Neill ............... 370/338 |

FOREIGN PATENT DOCUMENTS

| | | |
|---|---|---|
| WO | WO 95/12297 | 5/1995 |
| WO | WO 96/27993 | 9/1996 |
| WO | WO 97/12475 | 4/1997 |
| WO | PCT/US98/47302 | 10/1998 |

OTHER PUBLICATIONS

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM SIGMOBILE Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

Network Working Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

* cited by examiner

METHODS AND APPARATUS FOR SEPARATING HOME AGENT FUNCTIONALITY

RELATED APPLICATIONS

This application claims the benefit of U.S. Provisional Patent Application Ser. No. 60/542,467 filed on Feb. 6, 2004, titled: "METHODS AND APPARATUS FOR SEPARATING HOME AGENT FUNCTIONALITY".

FIELD OF THE INVENTION

The present invention relates generally to the field of mobility management in communication systems and more specifically to methods and apparatus for providing an alternative architecture that decomposes home agent functions.

BACKGROUND

Mobile IP (MIP) is described in a number of documents developed in the IETF (Internet Engineering Task Force) (www.ietf.org). MIP provides for mobility management for a MN Home address (HoA) by tunneling packets at a Home Agent (HA) towards/from a MN Care of Address (CoA), at which the MN HoA is routable. MIP signaling between the MN and the HA, maintains the MN CoA/MN HoA binding at the HA, and updates it to each new CoA value as the MN moves between Access Routers, and hence across the routing topology.

The known MIP HA acts as both the end point for MIP signaling and also as the endpoint for MIP tunnel forwarding. The HA also issues routing adverts for the HoA prefixes at that HA, from which MNs are allocated HoAs. The MIP HA must have a security association with each MN, and also with any Foreign Agent (FA) through which the signaling traverses. This is to ensure that binding changes can only be made by authorized MIP nodes. The end result is typically a HA router platform with significant forwarding, mobility signaling and security processing responsibilities. The HA also has timely visibility of the topological location and movement of the MN which can be useful for Location Based Services, and for presence management. However, the processing and publishing of such information to application services places additional significant burdens on HA nodes. A further problem with HAs is that from a security and management perspective they should be ideally located behind a firewall in an applications server farm of the operator but this causes high volume, low value traffic to trombone through the firewall twice, i.e., to visit the HA and be onward forwarded to the MN.

FIG. 1 shows the prior art Mobile IP signaling between a MN 220, a FA 224 and a HA 230. Message 260 is a MIP Registration Request (RREQ) message from the MN 220 to the FA 224, whilst 261 is a RREQ from the FA 224 to the HA 230. This message flow can be used to register either a MN CCoA or a FA CoA into the HA 230 for the HoA of the MN 220. The MIP Registration Response (RREP) is from the HA 230 to the FA 224 and is shown as message 262, which is forwarded to the MN 220 as message 263. This confirms the installation of the mobility binding into the HA 230 and FA 224, between the MN HoA and the MN CoA. In the case of a registered FA CoA, packet flow 264 between a CN 250 and the MN HoA is received at the HA 230, and then tunneled to the FA CoA in tunnel 265. MIP signaling can alternatively employ a RREQ message 270 from the MN 220 to the HA 230, and a RREP message 271 from the HA 230 to the MN 220, to install a MN CCoA into the binding at the HA 230. Packet flow 272 shows a flow of packets between CN 250 and the MN 220, which when received at the HA 230 are tunneled to the MN CCoA using tunnel 273 according to the stored binding for the MN HoA. This binding can be installed using either the signaling messages 260, 261, 262 and 263, or alternatively messages 270 and 271.

A redundant pair of HAs, synchronised with Virtual Router Redundancy Protocol (VRRP), is generally considered to be the optimal deployment configuration for an all-IP mobility domain, with any HA failure then being hidden by the synchronization protocol with the redundant HA. However, as the need grows to integrate mobility events with value-adding processes, including external application servers, this centralized (hot standby) architecture becomes more and more of a bottleneck as the amount of state, e.g., MN communication state and related information, to be synchronized grows.

In view of the above discussion, it should be apparent that there is a need for improved methods of providing functionality of the type provided by existing HA's while hopefully avoiding some of the problems with existing HA implementations.

SUMMARY

The present invention is directed to methods and apparatus for providing an alternative MIP HA architecture that decomposes, e.g., splits, conventional functions of a MIP HA, to separate and distribute the MIP signaling and tunneling endpoints. For example, the tunneling and control functionality may be implemented by a HA of the present invention while actual data packet forwarding and redirection is performed, under the control of the HA of the invention, by a tunneling agent node. The tunneling agent node which serves as the data packet forwarding redirection node for a mobile as it moves from one location to another may be located outside of a firewall used to protect routing control functionality provided by the HA of the invention. This approach provides a number of significant benefits for the support of mobility in IP networks. The HA of the present invention often serves as a routing control device instructing TA's where to send packets including a Home Address corresponding to a particular node. The TA is used to receive packets including a Home Address corresponding to a mobile node and to forward the data packets to a mobile node via a tunnel established under control of the HA of the invention. In contrast to existing MIP where the data packet forwarding paths and control paths used to control data packet forwarding are the same, in various embodiments, the TA which is responsible for data packet forwarding is outside the control signaling path that exists between a MN and the HA. In such an embodiment, the TA may be outside a firewall used to protect the HA through which control signals, e.g., control packets between the MN and HA of the invention pass. By placing the data packet forwarding control used to support end node mobility from the network node (TA) responsible for data packet forwarding and redirection of packets directed to a mobile nodes Home Address to its current location, numerous implementation benefits can be achieved while still supporting a high degree of mobile node mobility. As a mobile node changes its point of attachment from one access node to another access node, it may and normally does, notify the HA of the present invention of the change in location. The HA of the invention will then instruct the TA associated with the mobile nodes Home Address to redirect packets towards the new access node and stop the direction of packets including the mobile node's Home Address to the access node which it was previously using as a point of network attachment. Access nodes may be implemented as wireless base stations which can interact with one or more mobile nodes via wireless communications links.

The methods and apparatus of the present invention which split conventional Home Agent routing control and data packet forwarding (tunnel agent functionality) into two distinct nodes has several advantages.

i) The approach of present invention involving splitting conventional HA functionality between different nodes enables a HA, in accordance with the invention, to be implemented on a centralized processor rich server platform in a high-availability configuration as is commonly used for AAA and other databases. This HA, in accordance with the invention, could serve the MIP signaling needs of significant portion of a domain, and be incrementally grown with demand.

ii) The server based HA platform of the invention provides greater accessibility for Application Servers and the AAA system into MIP data for a domain, given that the HA, in accordance with the invention, can now be colocated with those servers in the web farm. Traditional HAs being located near such web farms were previously more problematic due to the large signaling and data forwarding load on such boxes.

iii) This HA, in accordance with the invention, can serve a large number of distributed TAs (tunneling agents), e.g., nodes used to receive and forward data packets to a MN despite changes in the MN's point of network attachment, e.g., access node used to attach to the network. Each TA may be implemented with relatively minimal MIP TA software, memory and processor capabilities. In some embodiments, each TA implements an authorizing security association with its domain HA, rather than an SA with each MN and/or FA with which it has a MIP binding. This makes TA support possible on a wide range of router hardware, and reduces the impact of each TA failure to the MNs assigned HoAs from that TA. TAs on Access and Border Routers are possible.

iv) In accordance with the invention, in some embodiments, MNs can and do have a realm specific HA address and authorizing extension that can be common across a large set of TAs within that domain. This can reduce the MN configuration and the load on a AAA system for dynamic HA assignment as compared to conventional MIP implementations. This load becomes part of the TA and HoA assignment load on the domain HA.

v) The presence of a TA, in addition to the HA of the invention, is hidden from the MN when using a FA CoA. This provides backwards compatibility with deployed MNs who, in some embodiments, will simply obtain a static HA allocation for each home domain, rather than a dynamic HA allocation via the AAA system which may be provided to MNs operating in accordance with various features of the invention.

vi) A TA address of the present invention is visible to a MN with a CCoA. The TA address is different from the HA address. However, the MN may not know whether the TA and HA addresses correspond to different or the same physical nodes. Either case is possible. The MN will see a MIP RREP (registration reply) from the HA address, containing a new extension directing the MIP tunnel to the TA address and will use the TA address without concern for the actual node to which it corresponds.

vii) The HA of the invention may be responsible for both TA and HoA allocation and may therefore remain in control of data packet forwarding while possibly being outside the data packet forwarding path. Thus, in accordance with the invention, the HA of the invention can operate as the mobile address management platform for the domain. It can therefore be integrated with other address management resources, and specifically can support protocols that provide dynamic prefix delegation and synchronized routing prefix configuration to the TAs.

viii) Redundant TAs of the invention are likely to be significantly less complex than redundant HAs due to the elimination of the need to exchange and synchronise MIP bindings and signaling state between peers as opposed to having each TA populated independently with the tunnel state. In accordance with some embodiments of the invention a different level of redundancy is provided for TAs than for HAs. This allows data forwarding redundancy to be supported even when the same level of HA forwarding control redundancy is not supported.

An exemplary new Tunneling Agent (TA) node, in accordance with some embodiments of the invention, that undertakes packet redirection, for a MN Home Address towards the stored MN Care of Address, on behalf of the Home Agent of the invention, sometimes called herein a decomposed HA since it performs a portion of the functionality, e.g., tunnel establishment and control portion, of a conventional MIP HA.

In some embodiments, a novel tunnel request message, in accordance with the invention, from the decomposed HA (DHA) can be used to cause the Tunneling Agent to install tunnel state corresponding to a binding entry at the DHA. An associated tunnel response message of the invention can be used to inform that DHA that the tunnel state has been installed in the TA. Various features of the present invention are directed to a sequence number space managed by the DHA so that tunnel request and response messages can be matched at the DHA, and a security association between the DHA and the TA so that the tunnel request and response messages can be secured.

Still other features of the invention are directed to a MN binding entry in the DHA that can be associated with multiple TAs that support packet redirection for the MN HoA so that tunnel state for the MN HoA/CoA binding can be installed concurrently in multiple TAs, to enable routing metrics to control which TA will tunnel each packet towards the MN HoA.

One feature is directed to an extension to a conventional MIP RREP which is communicated towards the MN, the Access Node and the TA(s) so that the TA address(es) can ultimately be returned to the tunnel endpoint node that has the MN CoA as an interface address, so that the tunnel endpoint address knows where to tunnel upstream packets and from where to expect to receive tunneled packets. A method for creating and maintaining a security association between the DHA of the invention and the tunnel endpoint node (an AN or MN) for securing the TA address in that RREP message so that the tunnel endpoint can trust the address value(s) is also described.

Another feature of the invention is directed to a new MIP RREQ (registration request) message between the TA and the DHA which enables the TA to request authorization from the DHA to install tunnel state that matches binding state in the MIP RREQ message. A matching RREP message of the invention enables the DHA to authorize the tunnel installation, as well as the use of a security association between the TA and the DHA to secure these messages.

Various aspects of the invention are directed to a method of informing the MN of the address of the TA(s) to be used in a MIP RREQ towards the DHA. The invention alternatively describes a method to assign the TAs at the access node (AN) and to then forward the RREQ towards that TA address. The invention alternatively describes a method for the MN or access node to send a RREQ direct to the DHA but for the RREP to be directed via the TA(s) that are then assigned by the DHA for the binding between the MN HoA and the MN CoA. The RREP is then used both to inform the tunnel endpoint of the TA address as well as to install the tunnel state into the TA.

In accordance with some embodiments of the invention, the tunnel agent (TA) sends signaling packets (control information) to the DHA node whilst forwarding tunnel packets (data packets) to the tunnel endpoint node, whilst acting as the routing advertiser for the HoA of the MN.

Accordingly, some features of the invention relate to operating tunnel endpoint nodes (Mobile Nodes and/or Access Nodes (ANs)) to send tunnel packets to the tunnel agent whilst directing signaling packets to the DHA, optionally via the tunnel agent in accordance with the invention is also described.

DETAILED DESCRIPTION OF INVENTION

Figure 2:
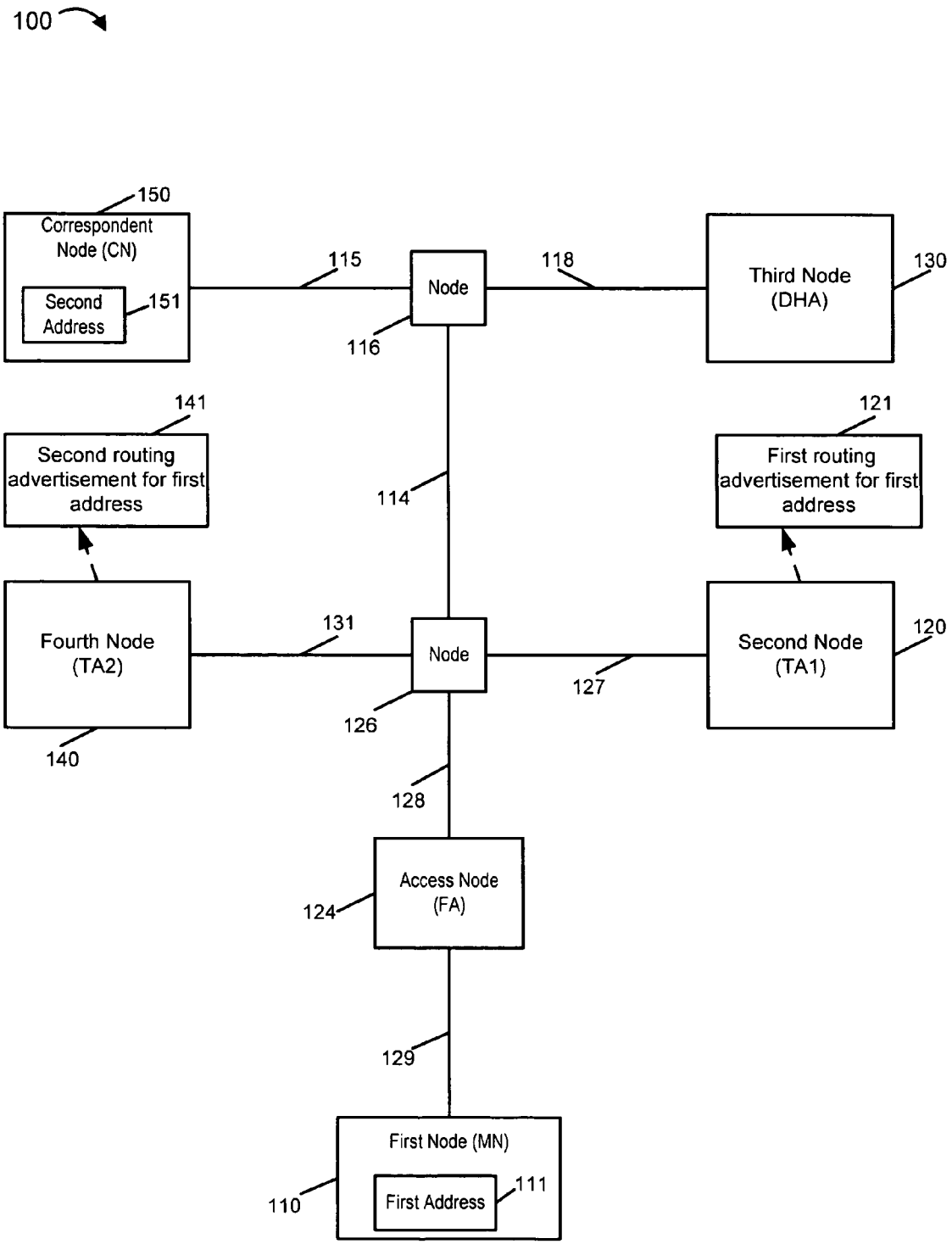
FIG. 2 is an illustration of an exemplary system, implemented in accordance with the present invention and using methods of the present invention.

FIG. 2 shows an exemplary network 100 illustrating elements of the invention. A first node 110 is a fixed or mobile end node (MN) that is coupled to an access node, e.g., an access router, 124 by link 129. Link 129 can be a fixed medium such as a cable, or a wireless medium such as is common in cellular systems. The Access node 124 may contain a MIP Foreign Agent or Attendant Agent. The Access Node 124 is coupled to a network node 126 via a link 128, which is further coupled to another network node 116 via link 114. Node 116 is further coupled to a Correspondent Node (CN) 150 that is also an end node, and which therefore may participate in the reception and transmission of IP packets in a communications session with the first node 110. In such sessions, packets sent from the MN 110 to the CN 150 have a source address equal to a first address 111 assigned to the MN 110, known as the home address of the MN 110, and a destination address equal to a second address 151 assigned to the CN 150. A third node 130, called a decomposed Home Agent (DHA), is further coupled to node 116 via link 118. The DHA 130 acts a signaling endpoint for mobility signaling. A second node 120, called tunneling Agent 1 (TA1) is further coupled to node 126 via link 127 and an optional fourth node 140 called Tunneling Agent 2 (TA2), which performs the same functions as the second node 120, is also coupled to node 126 via link 131.

The second node 120 and the optional fourth node 140 run a routing protocol and transmit a routing advertisement (121, 141), respectively, that includes the first address 111, indicating to the routing system that packets with a destination address equal to the first address 111 should be forwarded to either the second node 120 or the fourth node 140. Note that for the purposes of the invention, each of the other nodes that participate in the routing protocol retransmit a routing advertisement that includes the first address where said retransmitted routing advertisements contain modified metrics but continue to indicate that the packets with a destination address equal to the first address 111 are to be forwarded to either the second or fourth node (120, 140) depending on the advertised metrics. Said packet will be received at the second node 120 if the routing metric seen by nodes 116 and 126 establishes that the preferred forwarding path is to the second node 120 according to routing protocol metrics. The fourth node 140 will be alternatively selected if it has the preferred path. Packets received at the second node 120, with a destination address equal to the first address 111, will be forwarded by the second node 120, acting as a tunnel origination point, to a tunnel endpoint node in a Mobile IP tunnel, if the second node 120 has a mobility binding entry in a binding table that stores the tunnel endpoint address (the Care of Address or CoA) for the first address 111 of the first node 110, otherwise known as the Mobile IP Home Address or HoA. This binding entry between the MN CoA and the MN HoA in the second node 120 is installed using mobility signaling between the first node 110, the second node 120 and the third node 130. The signaling may additionally be processed by the Access Node 124. The tunnel endpoint address can be an additional address at the first node 110, known as a Colocated Care of Address or CCoA, such that the tunnel terminates on the first node 110 and is exclusive to that first node 110. The tunnel endpoint address can alternatively be an address assigned to the Access Node 124, in which case the tunnel is terminated by the Foreign Agent or similar Mobile IP agent, and may be shared by other end nodes at that access node 124. Signaling can additionally be used to install a similar binding in the optional fourth node 140, so that received packets destined for the first node 110 can also be forwarded to the tunnel endpoint node (110 or 124). Various implementations using the invention therefore include separation of the tunnel origination point from the third node 130 (Home Agent), which is the signaling endpoint for mobility management. This is now further described.

Figure 3:
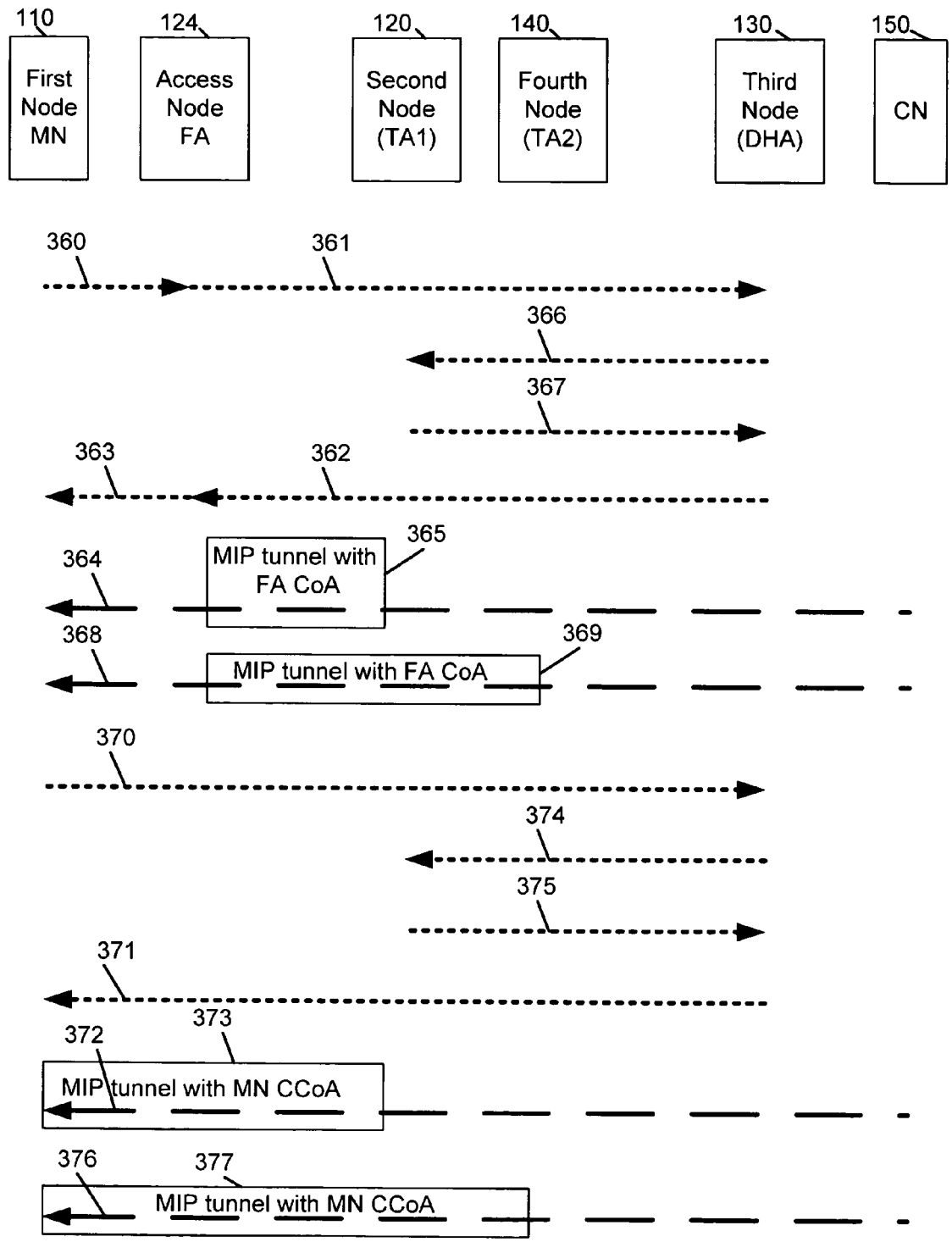
FIG. 3 illustrates exemplary signaling flows, in accordance with the present invention, supporting the decomposition of a MIP HA into a DHA and TAs.

FIG. 3 illustrates exemplary signaling flows of the invention that support the decomposition of a MIP HA into a DHA 130 for signaling, and a TA1 120 for tunnel (packet) forwarding in accordance with the invention. Signaling and forwarding will be described for the case of a RREQ that is first directed towards the FA 124 for registering a FA CoA into the third node (DHA) 130, and also for a RREQ directed towards the third node (DHA) 130 to install a MN CCoA in the third node (DHA) 130, but it should be understood that the signaling via the FA 124 can alternatively register a MN CCoA and hence enable a tunnel in the second node (TA1) 120 between the second node (TA1) 120 and the first node, MN 110.

When directed via the FA 124, RREQ messages 360 and 361 are employed to the third node 130, to install a binding between the first address 111 and the FA CoA, which is the address of the Access Node 124. The RREP is returned in messages 362 and 363 from the third node 130 to the first node 110 via the Access Node 124. However, the third node 130 is not the tunnel originator which instead is the second node 120. Therefore, the third node 130 returns the address of the second node 120 to the access node 124 in message 362, so that the access node 124 knows to expect tunneled packets from the second node 120 rather than the third node 130. In addition, the third node 130 sends a novel message 366 to the second node 120, either before or after sending the RREP 362. Message 366 installs the tunnel state in the second node 120 for the first address 111 to redirect received packets towards the MN CoA that has been communicated to the third node 130 by the MN 110. Message 367 is then sent by the second node 120 to the third node 130 to confirm that the tunnel state has been installed. Packet flow 364, between the CN 150 and the MN 110, will then be routed towards the second node 120, and then redirected to the Access Node 124 in tunnel 365. If the third node 130 alternatively sends messages similar to 366 and 367 towards the fourth node 140 instead of the second node 120 then packet flow 368 between the CN 150 and the MN 110 will instead be received at the fourth node 140 and be redirected to the Access Node 124 by tunnel 369, which the access node 124 will expect because it will have received the address of the fourth node 140 in message 362. Finally, it should be noted that the third node 130 can employ messages such as 366 and 367 with both the second node 120 and the fourth node 140, so that whichever routing metric is best for the first address 111, either the second node 120 or the fourth node 140 can receive packets with a destination address equal to the first address 111, and redirect the packet in a tunnel to the Access Node 124. This also means that message 362 should include the addresses of both the second node 120 and the fourth node 140.

If the MN 110, is instead registering a MN CCoA into the third node 130 then the second and fourth nodes 120, 140 will alternatively be instructed to install tunnel state, e.g., routing table information known as binding information, to redirect packets to that MN CCoA, and the addresses of the second node 120 and the fourth node 140 will be returned to the MN 110 via messages 362 and 363 so that the MN 110 knows where it should tunnel upstream packets.

Message 370 and 371 show the case of the MIP RREQ being directed at the third node 130 and the RREP directed back to the MN 110, to register a MN CCoA into the mobility binding at the third node 130, i.e. the RREQ and RREP are forwarded by the access node 124 but the access node does not otherwise participate in the processing of the RREQ and RREP mobility signals. Third node 130 then issues message 374 to the second node 120 to install a tunnel between the second node 120 and the MN CCoA at the first node 110. The message 375 is then sent by the second node 120 to the third node 130 to confirm installation of the direct tunnel. Again, message 371 can be sent by the third node 130 any time after the reception of message 370, including before sending message 374. A preferred method would be to send message 371 on reception and processing of message 375 so that the MN 110 is assured that the state in the second node 120 has been installed. The packet flow 372 from the CN 150 to the MN 110 is then received at the second node 120 and redirected to the MN 110 by tunnel 373. If the fourth node 140 is instead used, then the packet flow 376 from the CN 150 to the MN 110 HoA will be instead received at the fourth node 140 and redirected to the MN 110 using tunnel 377. Once again, both second node 120 and fourth node 140 tunnels 373 and 377 can be installed so that packets will be forwarded to the MN 110 by whichever of the second node 120 and fourth node 140 is the preferred packet receiver for the first address 111 (MN HoA), according to the routing protocol.

FIG. 3 illustrates that in each of the cases, a set of communications links, e.g., a communications triangle is formed between the tunnel endpoint node (110,124), the DHA node (the third node 130) and the TA node, (e.g., second node 120), such that signaling is directed via the tunnel endpoint node (110,124) to DHA node (third node 130), whilst packets are received at the tunnel endpoint node (110,124) from the TA node (second node 120), with the DHA node (third node 130) and TA node (second node 120) using new protocol messages to tie the signaled mobility binding state (e.g., address/tunnel information) at the DHA node (third node 130) into the tunnel origination state (tunnel source address and other information) at the TA node (second node 120). The MN 110 should also be informed of the second node (TA1) 120 and/or the fourth node (TA2) 140 addresses which is achieved by including them in message 371 from the DHA 130. These new protocol messages 366, 367, 374, 375 and the new extensions in MIP messages 362, 363, 371 are not found in prior art mobility signaling and, in fact, in the prior art such signaling are not needed since the signaling endpoint and the tunnel origination point are both in the same Home Agent node 230 in the case of conventional MIP.

Messages 366,367 or 374,375 should be protected by a security association that is known to the second node 120 and the third node 130 and/or a security association that is known to the fourth node 140 and the third node 130 so that the third node 130, but not other nodes, can install and modify tunnel state in the second node 120 and fourth node 140. In addition, message 362, 363 and/or 371 should securely return the address of the second node 120 and/or the fourth node 140 from the third node 130 to the tunnel endpoint node (110 or 124) using a security association known to both the third node 130 and the tunnel endpoint node (110,124). This is done so that the tunnel endpoint node (110, 124) can safely direct upstream packets to the tunnel agent 120, 140 and so that the tunnel endpoint node (110, 124) will not accept packets from other tunnel agents.

In a further inventive step, the third node 130 can store information associating the first address 111 with the second node 120 and/or the fourth node 140, which are responsible for advertising that address into the routing system. The third node 130 can store such information for each of the addresses that can be assigned to MNs (mobile nodes) 110, and the tunnel agents 120, 140 that can provide forwarding for each such address. The messages 360, 361 or 370 can then request that the third node 130 allocate an address such as the first address 111 to the first node 110, and this address can then be returned to the MN 110 in messages 362, 363 or in message 371. The third node 130 can then know towards which tunnel agent(s) such as the second node 120 and/or the fourth node 140 to direct messages 366 or 374 without having to interrogate an external system such as an AAA (Authentication, Accounting, Authorization) or LDAP (Lightweight Directory Access Protocol) database.

Figure 14:
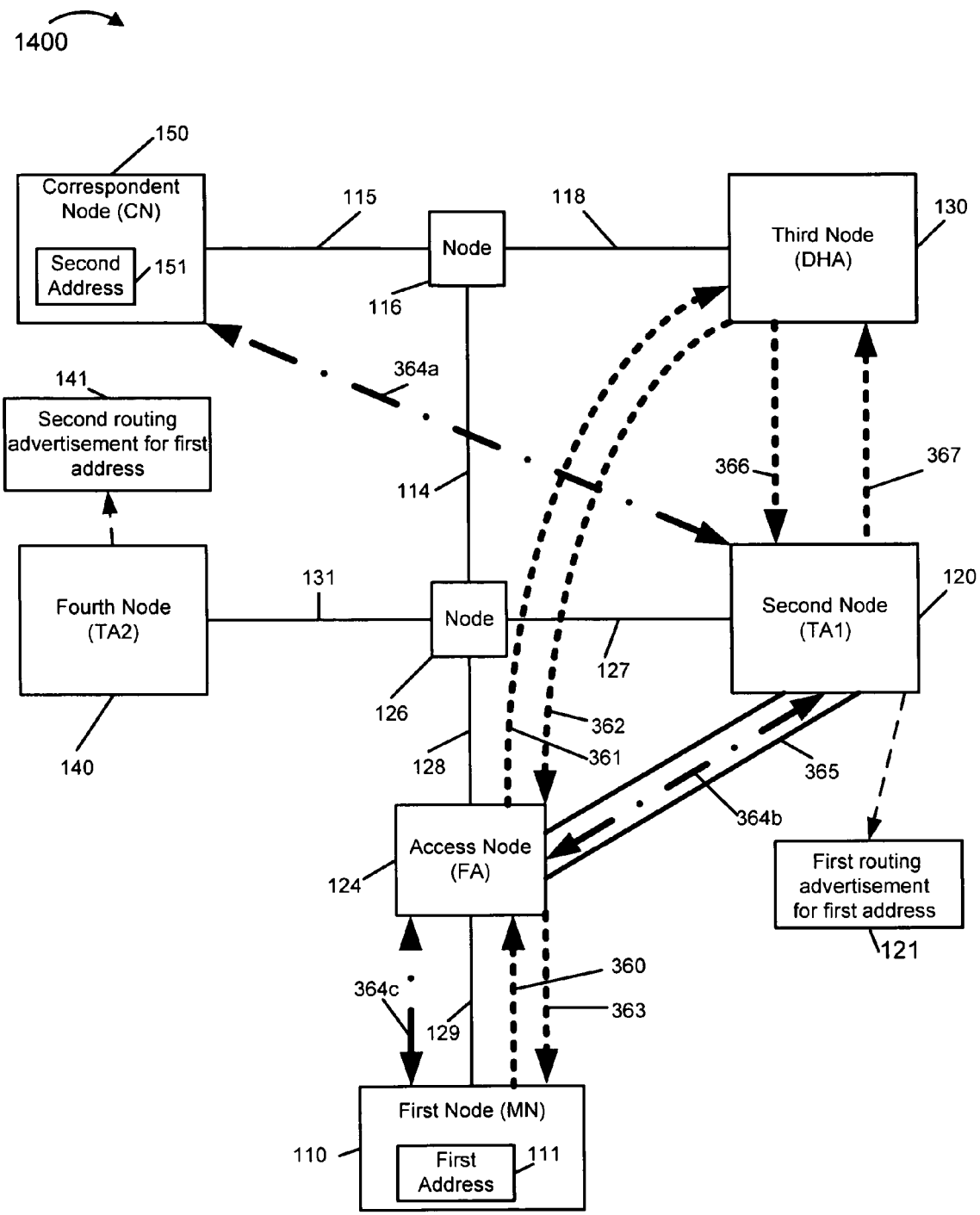
FIG. 14 is a drawing illustrating exemplary message and packet flows from FIG. 3 superimposed on the exemplary system of FIG. 2 to further illustrate the present invention.

FIG. 14 is a drawing 1400 showing some of the messages and packets flows of FIG. 3 overlaid onto the exemplary communications system 100 of FIG. 2. Messages 360, 361, 362 and 363 enable the first node 110 to install the binding, e.g., address and routing information, in the third node 130 via the access node 124, for the first address 111. The third node 130 then installs tunnel state commensurate with that binding state into the second node 120, using messages 366 and 367, said second node 120 being responsible for injecting the routing advertisement 121 into the routing system for the first address 111. Packet flow 364 of FIG. 3 is represented in FIG. 14 as the composite of packet flow 364a+packet flow 364b and packet flow 364c. Packets 364a, directed from the second address 151 of the Correspondent Node 150 to the first address 111, will then be received at the second node 120, and be forwarded as packets 364b via redirected flow tunnel 365 by said installed tunnel state towards the Care of Address of the first address 111 of the first node 110, which in this case is the Foreign Agent CoA of the Access Node 124. Next, packets 364c will be forwarded from AN 124 to MN 110.

If the Care of Address of the first address 111 of the first node 110 is a Colocated care of Address of the first node 110 (rather than a CoA of the AN 124), packets 364a received by second node 120 may be forwarded via a tunnel to the first node 110. In addition, if a Colocated Care of Address is employed by the first node 110, the messages 370 and 371 may alternatively be sent direct to the third node 130 triggering messages 374 and 375 between the third node 130 and the second node 120.

It is therefore clear from FIG. 14 that, in accordance with the invention, mobility signaling is undertaken by either the first node (MN) 110 or the access node (AN) 124 with the third node (DHA) 130, whilst redirected packets, e.g., data packets corresponding to a communication session between the MN 110 and another MN 150, are received from the second node (TA1) 120. In contrast, in prior art systems, mobility signaling is undertaken by either a MN or an AN with a conventional HA, and redirected packets are received from the same conventional HA.

Thus, in contrast to conventional MIP, the packet forwarding control signals, e.g., 361, 362, 366, 367 do not follow the same path as the redirected data packets 364a which do not traverse the DHA 130. That is, the DHA 130 is outside the data packet forwarding path while being able to control the path to reflect changes in the MNs point of network attachment.

Figure 4:
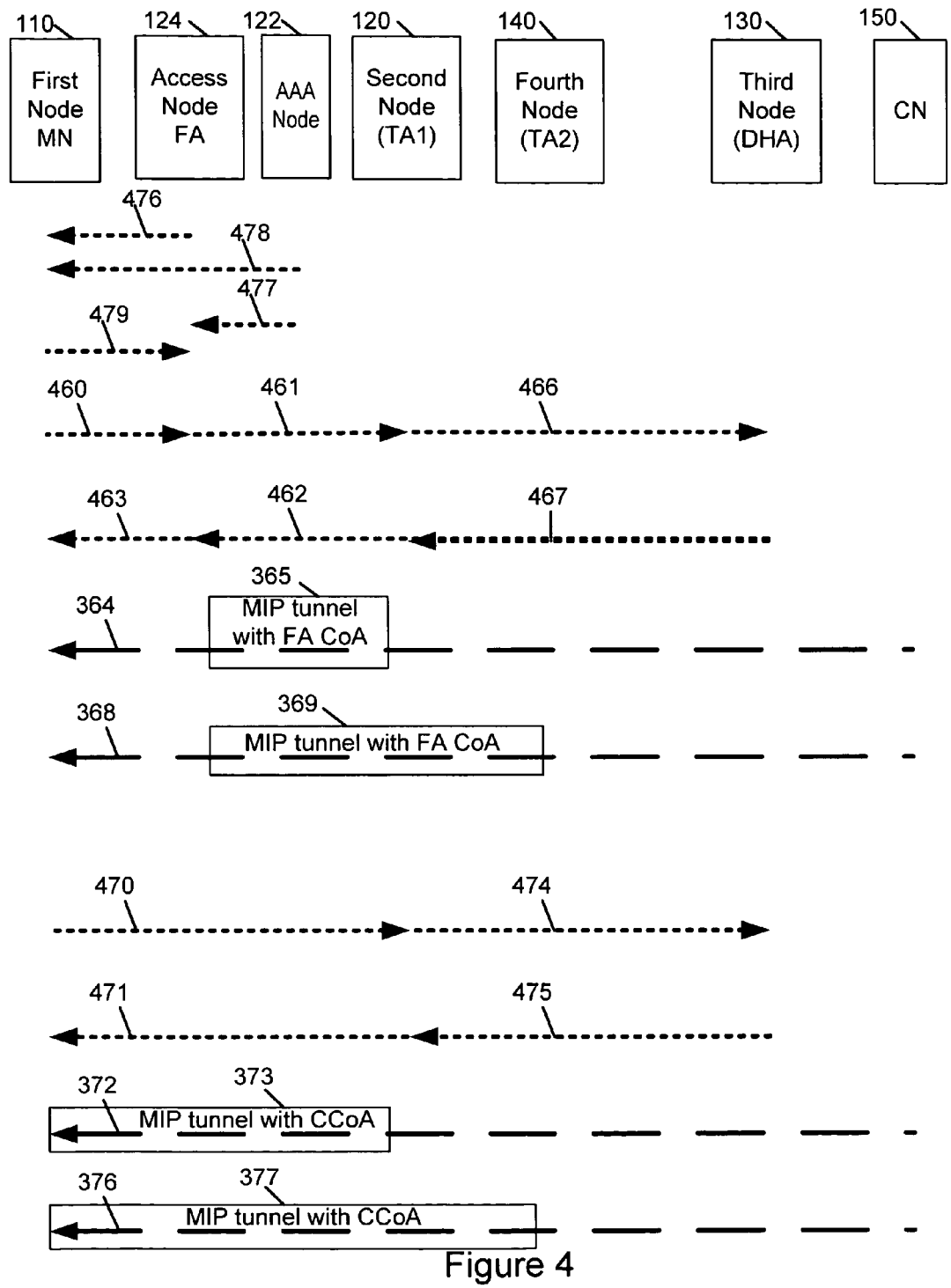
FIG. 4 illustrates additional exemplary signaling flows, representing additional embodiments, in accordance with the present invention.

An alternative embodiment of the invention is shown in FIG. 4, for the case of a MN CCoA (mobile node co-located care of address) and a MN FA CoA, and for mobility signaling directed and bypassing the Access Node 124. In other words, the Access Node 124 may act as a simple pass through device for forwarding packets as opposed to having packets addressed to the Access Node 124. Message 460 is a RREQ to the Access Node 124, which is then directed to the second node 120 as message 461, before finally being directed to the third node 130 as message 466. The RREP is then returned as messages 467, 462 and 463 back through the second node 120 and the Access Node 124 to the MN 110, and are used to carry the address of the second node 120 to the tunnel endpoint node (110, 124). Alternatively, message 470, 474, 475 and 471 can bypass the Access Node 124 but still install the tunnel state in the second node 120 between the second node 120 and the tunnel endpoint node (110), the binding state in the third node 130 between the MN CCoA and the MN HoA (Home Address), and inform the tunnel endpoint node (110) of the address of the second node 120.

The packet flow 364 that is received at the second node 120 is then once again redirected to the FA CoA (foreign agent care of address) using tunnel 365. Alternatively, the packet flow 372 is redirected to the MN CCoA using tunnel 373. If the fourth node 140 is selected either instead of or in addition to the second node 120 as a tunnel originator, then packet flow 368 will be redirected by tunnel 369 and packet flow 376 will be redirected by tunnel 377.

In either case, the RREQ signaling can install the tunnel state into the second node 120 directly, whilst also installing the binding state into the third node 130. This ensures that no new protocol is required between the third node 130 and the second node 120, and extensions to MIP RREQ and RREP messages alone can be used to install the required state (tunnel/packet forwarding information).

Messages 466, 467 or 474, 475 are protected by a security association that is known to the second node 120 and the third node 130 and/or a security association that is known to the fourth node 140 and the third node 130 so that the third node 130 can install tunnel state in the second node 120 and fourth node 140 but other nodes cannot. In addition, message 462, 463 and/or 471 return the address of the second node 120 and/or the fourth node 140 to the tunnel endpoint node (110, 124) so that the tunnel endpoint node (110,124) can direct upstream packets to the tunnel agent 120,140 and so that the tunnel endpoint node (110, 124) will not accept packets, associated with the MN HoA 111, from other tunnel agents.

In a further inventive step, in some embodiments, when the MN 110 uses message 460 then the Access Node (Router) 124 determines the required tunnel agents to be visited, i.e. via information received in signal 477 via a policy node such as AAA 122 and/or information received in signal 479 from MN 110, and can therefore issue message 461 towards either the second node 120 and/or the fourth node 140 which includes the address of the second node 120 and/or the fourth node 140 that is to be used by the MN 110. The Access Node 124 can then receive message 462 from either or both tunnel agents (120,140) and can direct upstream packets to the appropriate tunnel agent. Alternatively, when the MN 110 uses message 470 then the MN 110 needs to know the address of the second node 120 and/or the fourth node 140 for inclusion into message 470. This can be achieved by the access node 124 advertising this tunnel agent information to the MN 110 in message 476 and/or via information received in signal 478 from a policy node such as AAA node 122. Alternatively or in addition, the tunnel agent information can be returned to the MN 110 by the third node 130 as part of the assignment of the first address 111 to the first node 110. This is achieved by first using messages 360, 361, 362, 363 or messages 370, 371 to bypass the second node 120 and/or fourth node 140, to obtain the second node 120 and fourth node 140 addresses along with the first address 111. The MN 110 then resorts to using messages 460, 461, 466, 467, 462, 463 or messages 470, 474, 475, 471 via the communicated tunnel agents.

In a further inventive step, the MN 110 can use message 370 to reach the third node 130, but the third node 130 uses messages 475 and 471 to direct the response back through the second node 120 and/or the fourth node 140 so that the MN 110 can determine both the first address 111 and the tunnel agent(s) to be used for packet tunneling for said first address 111.

In a further inventive step, the MN 110 can use messages 360, 361 to reach the third node 130, but the third node 130 then uses messages 467, 462, 463 to direct the response back through the second node 120 and/or the fourth node 140 so that the MN 110 can determine both the first address 111 and the access node 124 can determine the tunnel agent(s) to be used for packet tunneling for said first address 111.

Figure 15:
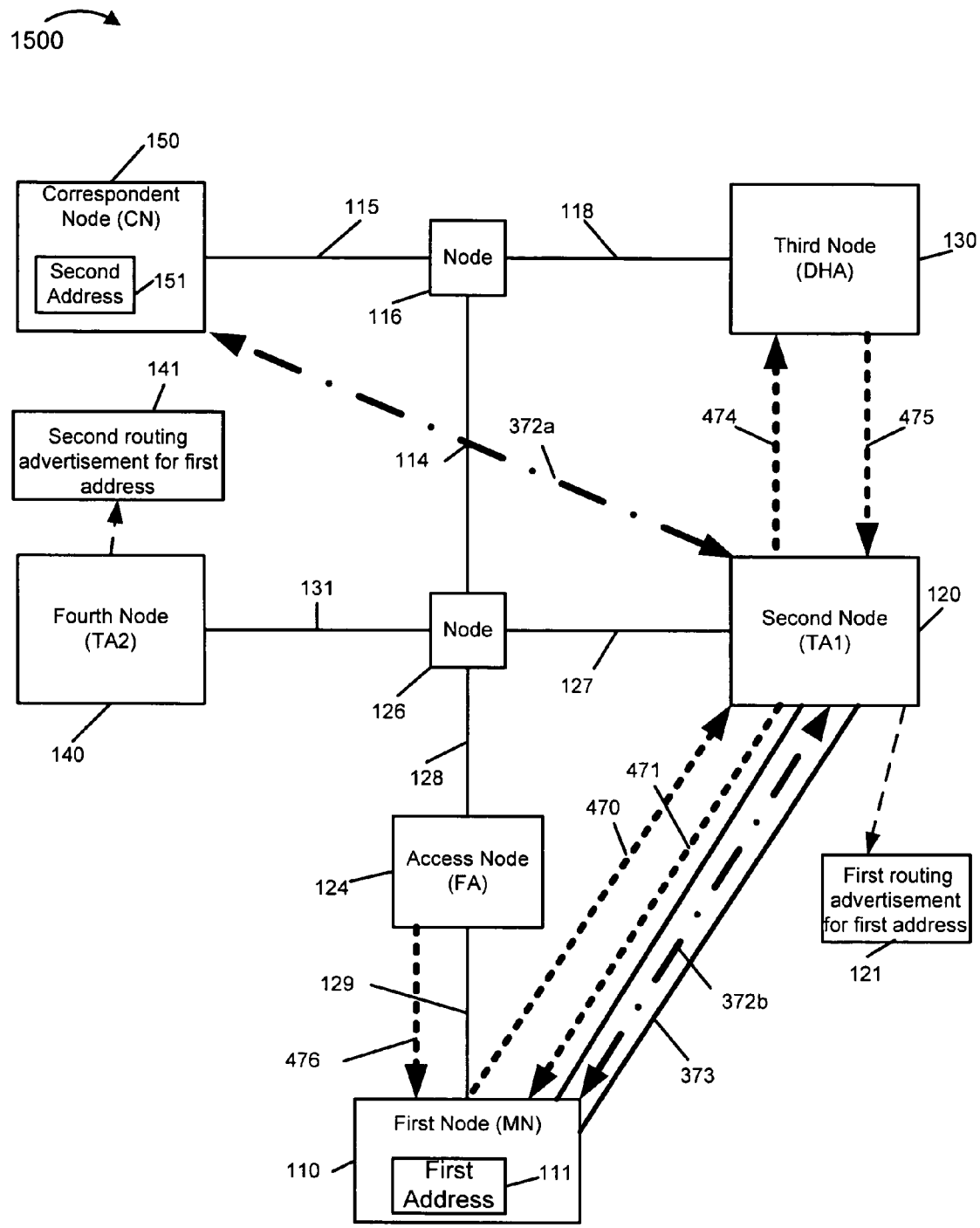
FIG. 15 is a drawing illustrating exemplary message and packet flows from FIG. 4 superimposed on the exemplary system of FIG. 2 to further illustrate the invention.

FIG. 15 is a drawing 1500 showing some of the messages and packets flows of FIG. 4 overlaid onto the exemplary communications system 100 of FIG. 2. In the FIG. 15 example, control signals used to establish data packet forwarding tunnels traverse the tunnel agent 120 used to forward data packets from another mobile node 150 to the first MN 110. However, the DHA 130 which controls the tunnel establishment and thus data packet redirection remains outside the data packet forwarding path between the CN 150 and the first MN 110. Messages 470, 471, 474 and 475 enable the first node 110 to install the binding in the third node 130 and the tunnel state in the second node 120, for the first address 111, said second node 120 being responsible for injecting the routing advertisement 121 into the routing system for the first address 111. Data packet flow 372, e.g., corresponding to a communications session between CN 150 and MN 110, of FIG. 4 is represented in FIG. 14 as the composite of packet flow 372a+packet flow 372b. Packets 372a, directed from the second address 151 of the Correspondent Node 150 to the first address 111, will then be received at the second node 120, and be forwarded as packets 372b in redirected flow of tunnel 373 by said installed tunnel state towards the Care of Address of the first address 111 of the first node 110, which in this case is the Colocated CoA of the first Node 110, but could otherwise be a Foreign Agent CoA of the access node 124. In addition, if a FA Care of Address is employed by the first node 110, the messages 460, 461, 466, 467, 462, 463 may alternatively be sent via the access node 124 and the second node 120 to install the binding and tunnel state. It is therefore clear from FIG. 15 that, in accordance with the invention, mobility signaling is undertaken by the first node (MN) 110 and the second node (TA1) 120 with the third node (DHA) 130, whilst redirected packets are sent and received by the second node (TA1) 120. In contrast, in prior art systems mobility signaling is undertaken by either a MN or an AN with a conventional HA, and redirected packets are received from the conventional HA.

Figure 5:
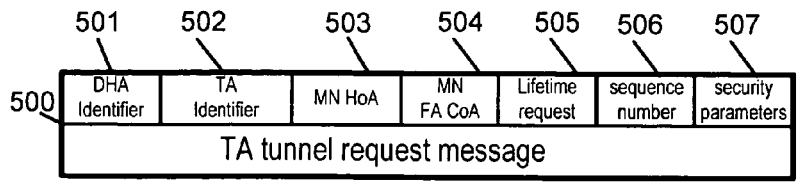
FIGS. 5, 6, 7, 8, 9, and 10 illustrate exemplary messages in accordance with the present invention.

FIG. 5 illustrates exemplary contents of a TA tunnel request message 500 in accordance with the invention. Exemplary TA request message 500 may be a representation of TA request message 366 or 374 used between the third node 130 and the second node 120 to install the tunnel state into the second node 120 based on the binding state in the third node 130. The message 500 includes the third node 130 identifier, which may be, e.g., the DHA source address in message part 501, and the second node 120 identifier, e.g., the TA destination address in message part 502. The MN HoA (home address) such as the first address 111 is included in message part 503 and the tunnel endpoint address such as the MN's FA CoA (Access Node 124 address) in message part 504. Message part 504 alternatively includes the MN CCoA when the first node 110 is the tunnel endpoint. In either case, the content of message part 504 specifically identifies an address of a tunnel endpoint node which is a different node than the tunnel agent that is itself identified in message part 502. The message 500 (366 and 374) therefore triggers the tunnel agent to build a tunnel between itself and the identified tunnel endpoint node for forwarding packets that are received with a destination address equal to that contained in message part 503. Message 500 (366, 374) further includes an optional tunnel lifetime request in message part 505 to indicate the length of time that the tunnel is to be provided. If absent, in some embodiments, the tunnel is created for an infinite time, and will then be deleted by a subsequent message 500 or similar such message. If the lifetime is zero, then the matching tunnel state is deleted by the tunnel agent 120. Message part 506 includes a sequence number managed by the third node 130 for ordering messaging with the second node 120. Message part 507 includes security parameters derived from a security association shared between the third node 130 and the second node 120, so that the contents of the messages 500 (366,374) can be encrypted, integrity checked and/or the sender authenticated. Note also that message part 503 contains an address that is included in a routing advertisement into the network routing protocol by the node identified in message part 502 and not by the node identified in message part 501.

Figure 6:
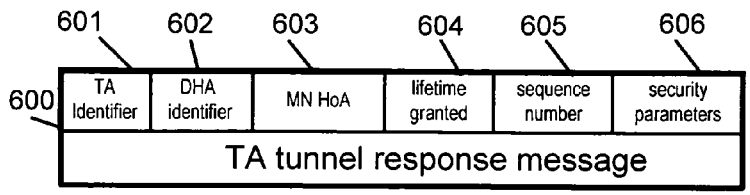

FIG. 6 illustrates exemplary contents of a TA tunnel response message 600 in accordance with the invention. TA tunnel response message 600 may be a representation of TA tunnel response message 367 or 375 used between the second node 120 and the third node 130 to confirm that the tunnel state has been installed into the second node 120 based on the binding state in the third node 130 (i.e. as a result of message 500). Message part 601 is the same as message part 502 whilst message part 602 is the same as message part 501, such that the messages are in the reverse direction as messages 500 (366,374). Message part 603 is the same as message part 503 whilst message part 604 contains the lifetime granted by the second node 120 which may be the same as, or different from, that requested in message part 505. Message part 605 includes the same value as message part 506 from the request message that triggered this response message, and therefore is used at the DHA 130 for matching responses to requests. Message part 606 includes security parameters derived from a security association that is also known at the third node 130 so that the second node 120 can encrypt, integrity protect and/or provide authentication for the message. Note also that message part 603 contains an address that is included in a routing advertisement into the network routing protocol by the node identified in message part 601 and not by the node identified in message part 602.

Figure 7:
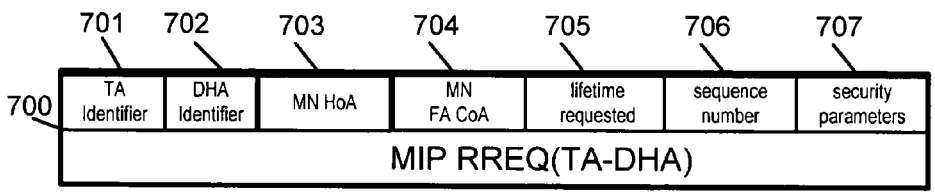

FIG. 7 shows an exemplary embodiment of a MIP RREQ (TA-DHA) message 700 in accordance with the invention. Exemplary message 700 may be a representation of messages 466, 474. The contents of exemplary message 700 are similar to those described with regard to FIGS. 5 and 6. Message part 701 includes the TA identifier and message part 702 includes a DHA identifier, establishing that this is a message from the TA 120 to the DHA 130. Message part 703 identifies the first address 111 as the MN HoA and message part 704 identifies the MN CoA which can be either a MN FA CoA (address of access node 124) or a MN CCoA (another address of MN 110). This indicates that a tunnel has been requested to be installed at the TA 120 between the TA 120 and the address in message part 704, said tunnel being between different nodes, and said address in message part 703 being advertised into the routing system by the TA 120 and not by the DHA 130. Thus, the TA 120 is the origination of the tunnel from the routing system's address advertisement perspective and not the DHA 130. This is in sharp contrast to conventional HAs which would be responsible for advertising the packet forwarding tunnel address since the known HA is operated as the end of the data packet forwarding tunnel in known systems. Message part 705 identifies the requested lifetime for the tunnel state at the TA 120 and message part 706 includes a sequence number from a sequence number space at the MN 110, that is used to match requests and responses at the MN 110 that are exchanged with the DHA 130. Message part 707 includes security parameters derived from a security association that is also known at the second node 120 so that the third node 130 can encrypt, integrity protect and/or provide authentication for the message. The message therefore requests that the DHA 130 authorize that the TA 120 install tunnel state, for the MN HoA (mobile node home address), with the MN CoA (mobile node care of address), for the requested lifetime.

Figure 8:
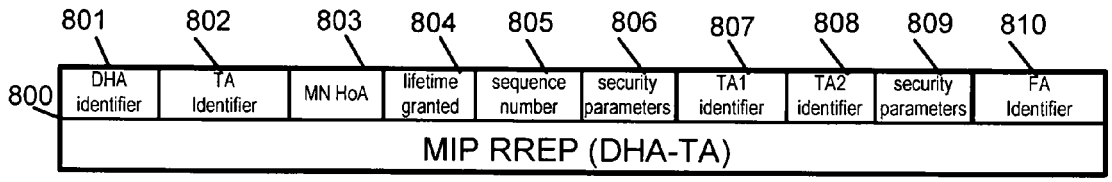

FIG. 8 shows an exemplary MIP RREP (DHA-TA) message 800 in accordance with the invention. Message 800 may be a response message to message 700. Exemplary MIP RREP (DHA-TA) message 800 may be a representation of the response message 467, 475 which is from the DHA 130 to the TA 120. Message part 801 is the same as message part 702 whilst message part 802 is the same as message part 701, such that the messages are in the reverse direction as message 700. Message 800 includes the same MN HoA in message part 803 as was received in message part 703, the same message part 805 as was received in message part 706 but a message part 804 that indicates the granted lifetime for the tunnel state which may be different to that requested in message part 705. Message part 806 includes security parameters derived from a security association that is also known at the third node 130 so that the second node 120 can encrypt, integrity protect and/or provide authentication for the message. Message 800 includes message parts 807 and 808 which include the address of the one or more TAs 120,140 that will act as tunnel agents, and which need to be passed to the tunnel endpoint node (110,124) by the TA 120,140 in messages 462,463, 471. The messages parts 807, 808 are therefore protected by security parameters 809 which are derived, in the exemplary embodiment, from a security association known to the third node 130 and the tunnel endpoint node (110,124) so that the tunnel endpoint node (110,124) can be assured that they are genuine. The response message 800 (467,475) is therefore authorization from the DHA 130 for the TA 120,140 to install the requested tunnel between the TA 120,140 and the MN CoA at the tunnel endpoint node (124,110). Note that when the RREQ was not originally routed via the TA 120,140 then the TA will not have an address for the access node 124 and so the message part 810 is then added to provide this information to the TA 120,140 and is also secured by the security parameters in the message part 806.

Figure 9:
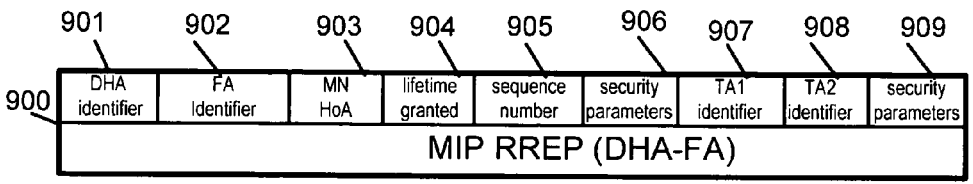

FIG. 9 shows an exemplary MIP RREP (DHA-FA) message 900 in accordance with the present invention. The exemplary response message 900 may represent the response message 362 between the third node 130 and the access node 124. Message 900 contents (901, 902, 903, 904, 905, 906, 907, 908, 909) are as described for the equivalent message parts in FIG. 8 (801, 802, 803, 804, 805, 806, 807, 808, 809), respectively, except that message part 902 now includes the address of the access node 124 as the destination address of the message, and message part 909 is now based on a security association known to both the access node 124 and the third node 130, so that the tunnel agents identified in message parts 907 and/or 908 can be trusted.

Figure 10:
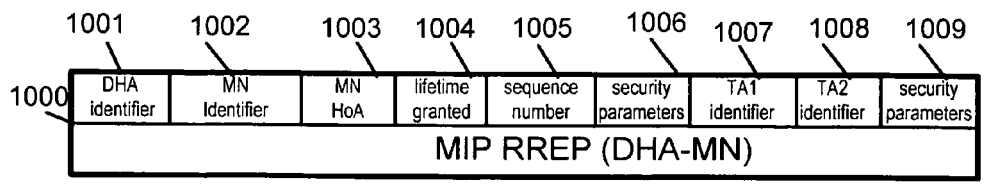

FIG. 10 shows an exemplary MIP RREP (DHA-MN) message 1000 in accordance with the present invention. Exemplary response message 1000 may be a representation of response message 371 between the third node 130 and the first node 110. Message 1000 contents (1001, 1002, 1003, 1004, 1005, 1006, 1007, 1008, 1009) are as described for FIG. 8 (801, 802, 803, 804, 805, 806, 807, 808, 809), respectively, except that message part 1002 now contains the address of the first node 110 as the destination address of the message, and message part 1009 is now based on a security association known to both the first node 110 and the third node 130, so that the tunnel agents identified in message parts 1007 and/or 1008 can be trusted.

In various embodiments of the invention, the binding state in the third node 130 can be used by network management and by applications to track the location, movement and reachability of the first node 110 and the first address 111 in a centralized system such as behind the firewall in a network operations zone of an operator network. Meanwhile, the third node 130 (and the associated operations firewall) do not have to forward data packets for MNs. This function is instead left to the second node 120 and fourth node 140, which are optimally located in the core of the network, and away from the operations zone. In addition, if the third node 130 fails then whilst new RREQ/RREP signals will be missed, packet forwarding can continue between the tunnel endpoint node 110, 124 and the tunnel agent 120,140 so resulting is a more reliable system. In addition, if the tunnel agent 120 fails, then routing will recalculate metrics causing each of the packets to be forwarded to the fourth node 140 instead of to the second node 120, therefore enabling the fourth node 140 to take over from the second node 120 so further improving system reliability. It can be further established that by using a multitude of distributed tunnel agents, with one or a pair of such nodes acting for a specific address prefix containing addresses that are allocated to a different subset of MNs in the system, then a single third node 130 can act as the signaling endpoint for each of the mobility bindings from MNs in the system, whilst the forwarding for packets to those MNs are distributed across the multitude of tunnel agents 120,140. The failure of a single or redundant pair of tunnel agents 120,140 then affects forwarding for the subset of MNs in the system, rather than for each of the MNs in the system which could be the case if the third node 130 was also acting as the tunnel agent. This limits the impact of any single failure in the system.

Figure 16:
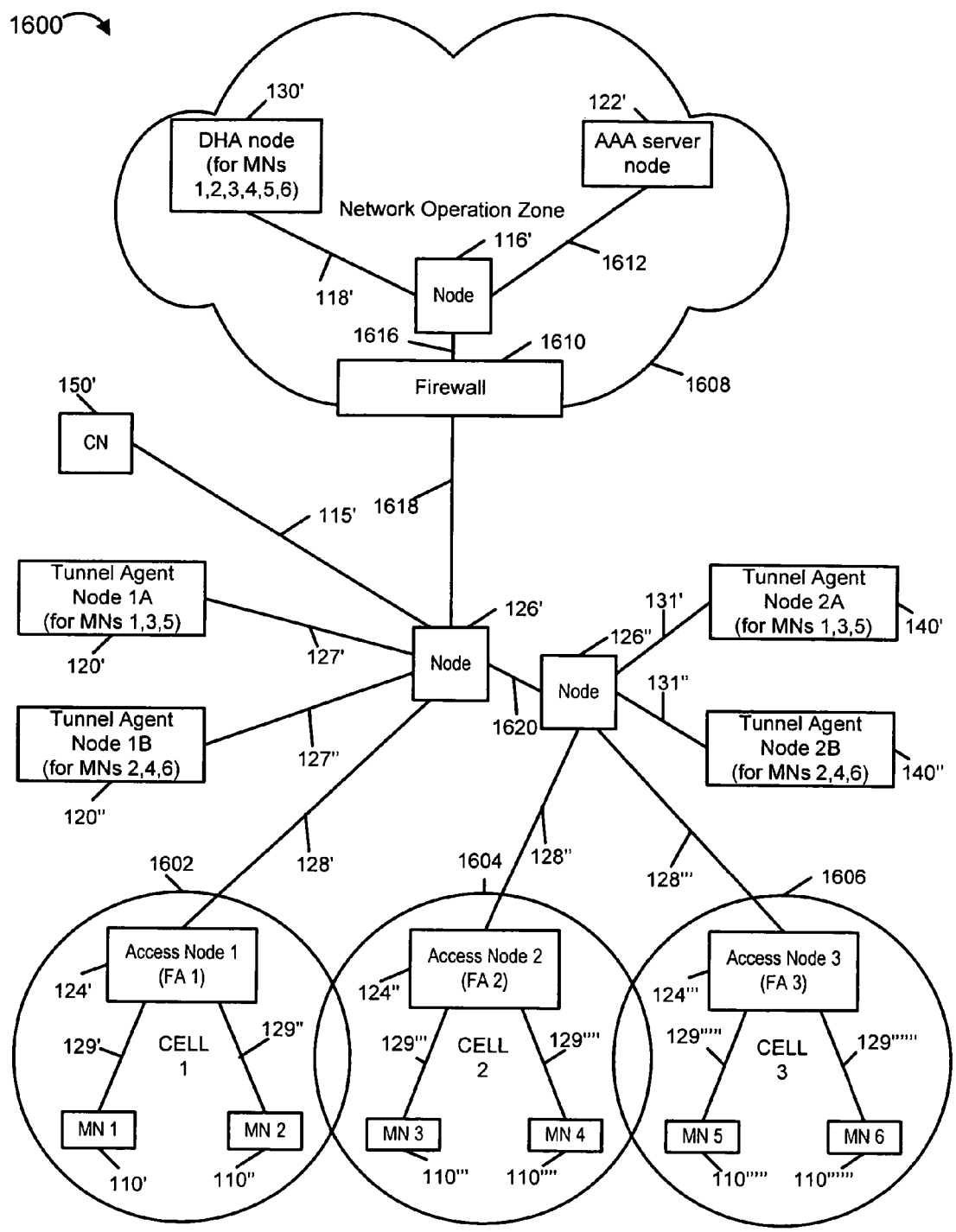
FIG. 16 illustrates an exemplary system implemented in accordance with the present invention which uses methods of the present invention, and which further illustrates various features of the present invention.

FIG. 16 shows an exemplary system 1600 implemented in accordance with the present invention and using methods of the present invention. FIG. 16 is presented for further illustrating the invention. System 1600 includes three exemplary cells (cell 1 1602, cell 2 1604, cell 3 1606) each representing the wireless coverage area of an access node (access node 1 124', access node 2 124'', access node 3 124'''), respectively. AN 1 124' is coupled to (MN1 110', MN2 110'') via wireless links (129', 129''), respectively. AN 2 124'' is coupled to (MN3 110''', MN4 110'''') via wireless links (129''', 129''''), respectively. AN 3 124''' is coupled to (MN5 110''''', MN6 110'''''') via wireless links (129''''', 129''''''), respectively. AN 1 124' is coupled to network node 126' via network link 128'; AN 2 124'' is coupled to network node 126'' via network link 128''; AN 3 124''' is coupled to network node 126'' via network link 128'''. Network node 126' is coupled to network node 126'' via network link 1620. Correspondence Node 150' is coupled to network node 126' via network link 115'. Tunneling Agent node 1A 120' and tunneling agent node 1B 120'' are coupled to network node 126' via network links (127', 127''), respectively. Tunneling Agent node 2A 140' and tunneling agent node 2B 140'' are coupled to network node 126'' via network links (131', 131''), respectively. System 1600 also includes a network operation zone 1608 which is secured by a firewall 1610 at its interface to the core network. Network operations zone 1608 includes a network node 116', a Decomposed Home Agent (DHA) node 130', and a AAA server node 122'. Network node 116' is coupled to DHA node 130', AAA node 122', and firewall 1610 via network links 118', 1612, and 1616, respectively. Network link 1618 couples the firewall 1610 to network node 126'.

Figure 1:
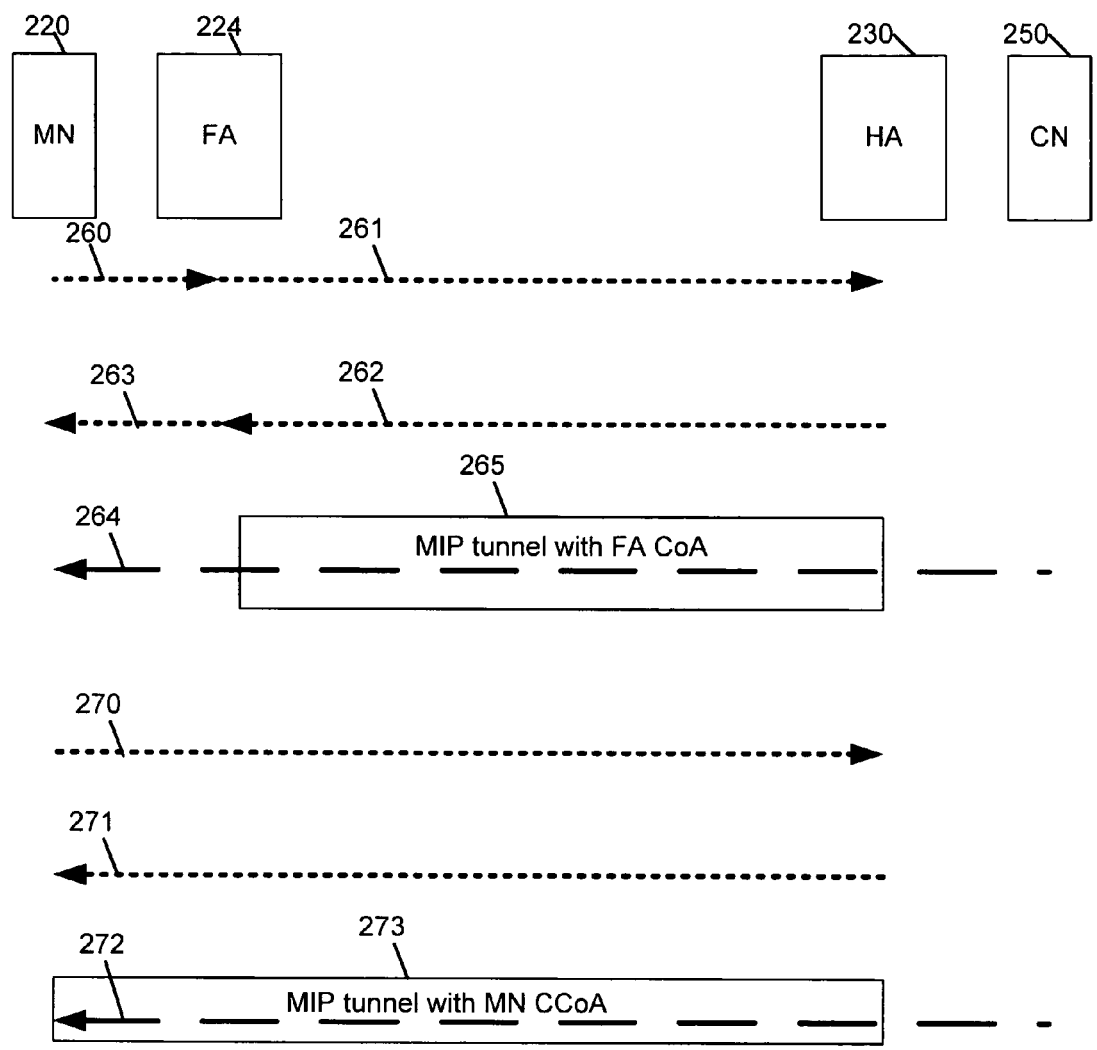
FIG. 1 illustrates prior art Mobile IP signaling between a mobile node, a foreign agent, and a home agent.

MNs (110', 110'', 110''', 110'''', 110''''', 110'''''') may be similar to first node MN 110 of FIG. 1. ANs (124', 124'', 124''') may be similar to AN 124 of FIG. 1. CN 150' may be similar to CN 150 of FIG. 1. Tunnel Agent nodes (120', 120'') may be similar to second node (TA1) 120 of FIG. 1. Tunnel Agent nodes (140', 140'') may be similar to fourth node (TA2) 140 of FIG. 1. DHA 130' may be similar to third node (DHA) 130 of FIG. 1.

In system 1600, the DHA 130' can act as the signaling endpoint for each of the mobility bindings from each of the MNs (MN 1, MN 2, MN 3, MN 4, MN 5, MN 6) in the system 1600, and DHA 130' does not have to forward data packets for MNs. The forwarding for packets to those MNs are distributed across the multiple of tunnel agents 120', 120'', 140', 140'', which are located in the core of the network. In system 1600, a pair of tunnel agents acts for a specific address prefix containing addresses that are allocated to a subset of MNs in the system 1600. Tunnel agent node pair 1A 120' and 2A 140' act for MN 1 110', MN 3 110''' and MN 5 110''''', while tunnel agent node pair 1B 120'' and 2B 140'' act for MN 2 110'', MN 4 110'''' and MN 6 110''''''.

Figure 11:
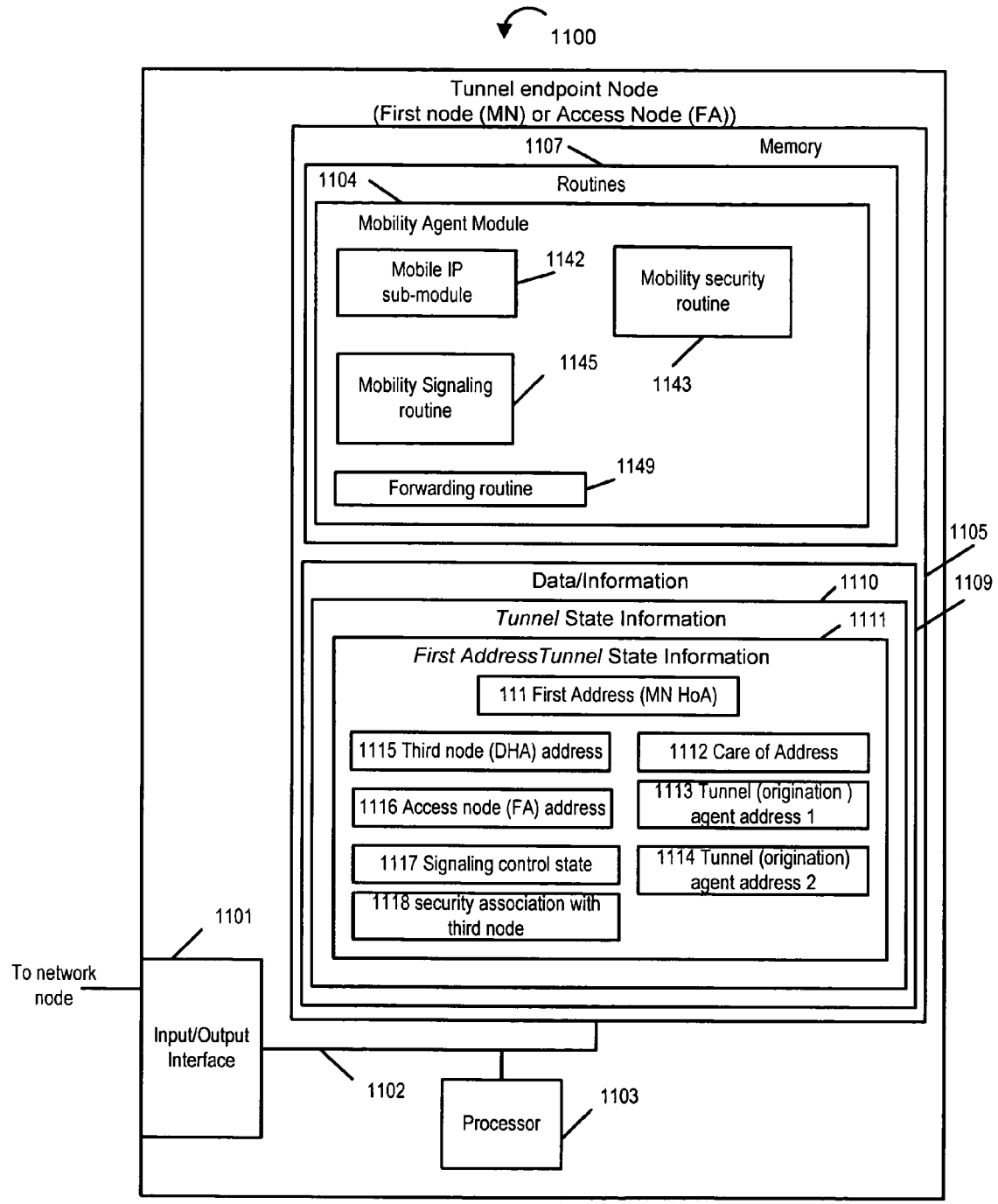
FIG. 11 illustrates an exemplary tunneling endpoint node, e.g., a Mobile Node or Access Node, implemented in accordance with the present invention and using methods of the present invention.

FIG. 11 shows an exemplary tunnel endpoint node 1100 implemented in accordance with the invention. Exemplary tunnel endpoint node 1100 can be either the first node 110 MN or the access node 124 of the exemplary system 100 of FIG. 1. The tunnel endpoint node 1100 includes input/output interface 1101 coupling the tunnel endpoint node to another network node, a communications bus 1102 coupling the input/output interface 1101 to a processor 1103 and a memory 1105. Input/output interface 1101 may include wireless and/or wire interfaces. The memory 1105 includes routines 1107 and data/information 1109. Processor 1103, e.g., a CPU, executes the routines 1107 and uses the data/information 1109 in memory 1105 to control the operation of the tunnel endpoint node and implement methods of the present invention. Routines 1107, e.g., program instructions, to be executed on processor 1103 include mobility agent module 1104. Mobility agent module 1104 include a mobile IP sub-module 1142, a mobility signaling routine 1145 used to send mobility messages to other mobility nodes, a mobility security routine 1143 for securing such messages, and a forwarding routine 1149 used to forward redirected packets to and from the tunnel agents 120,140. The mobile IP sub-module 1142 coordinates the signaling 1145, security 1143 and forwarding 1149 routines to support the mobility of a mobile node 110. The data/information 1109 in the memory 1105 includes tunnel state information 1110 including tunnel state information 1111 associated with the first home address of the MN 110. Tunnel state information 1111 includes the first address 111; a Care of Address 1112 of the MN 110 which is an address of the tunnel endpoint node 110,124; an address 1113 of the first tunnel agent 120; an address 1114 of the second optional tunnel agent 140; an address 1115 of the third node (DHA) 130; an address 1116 of the access node (FA) 124; signaling control state 1117 indicating which type of signaling sequence the tunnel endpoint node 1100 uses to perform mobility management with the third node 130; and a security association 1118 with the third node 130 used to secure such signaling. When the tunnel endpoint node 1100 is the Mobile Node 110, then the Care of address 1112 is another address of the MN 110. When the tunnel endpoint node 1100 is the access node 124, then the Care of Address 1112 may be the same as the address 1116 of the access node 124. The state information 1111 shows that the tunnel agent addresses 1113, 1114 are different from the address of the third node 1115. The tunnel endpoint node 1100 will forward and receive redirected packets with the tunnel agent addresses 1113,1114, and these addresses are not addresses 1115 of the third node 130, as they would be in prior art systems. When the tunnel endpoint node 1100 (124, 110) uses messages 361,370 to signal binding state to the third node 130 then the signal does not visit the tunnel agents 120,140. When the tunnel endpoint node 1100 (110,124) uses message 461, 466 to signal binding state to the third node 130 then the signal does visit the tunnel agents 120,140 first. When the tunnel endpoint node 1100 (110) uses message 470,474 to signal binding state to the third node 130 then the signal once again does visit the tunnel agents 120,140 first. The signaling control state 1117 controls which of the above signaling methods are to be employed for the first address 111.

Tunneling agent address 1 and tunneling agent address 2 are indicated as tunnel address, i.e., the address corresponding to the node at which the tunnel originates. It is possible for a tunnel to pass through one or more intermediate tunnels. In which case, intermediate tunnel agents and intermediate tunnel agent addresses may be used as well. However, the addresses of such intermediate tunneling agents will be different from the origination agent tunnel address and may or may not be stored in tunnel state 1111. Since techniques using intermediate tunnels to convey packets through a portion of a larger tunnel are common in various systems, such tunneling will not be described further.

While the exemplary tunnel endpoint node 1100 of FIG. 11 is described with respect to one exemplary MN 110, it is to be understood that in the case where the tunnel endpoint node is an Access Node, the tunnel endpoint node may include tunnel state for a plurality of mobile nodes, e.g., tunnel state for each MN attached to the network via the access node.

Figure 12:
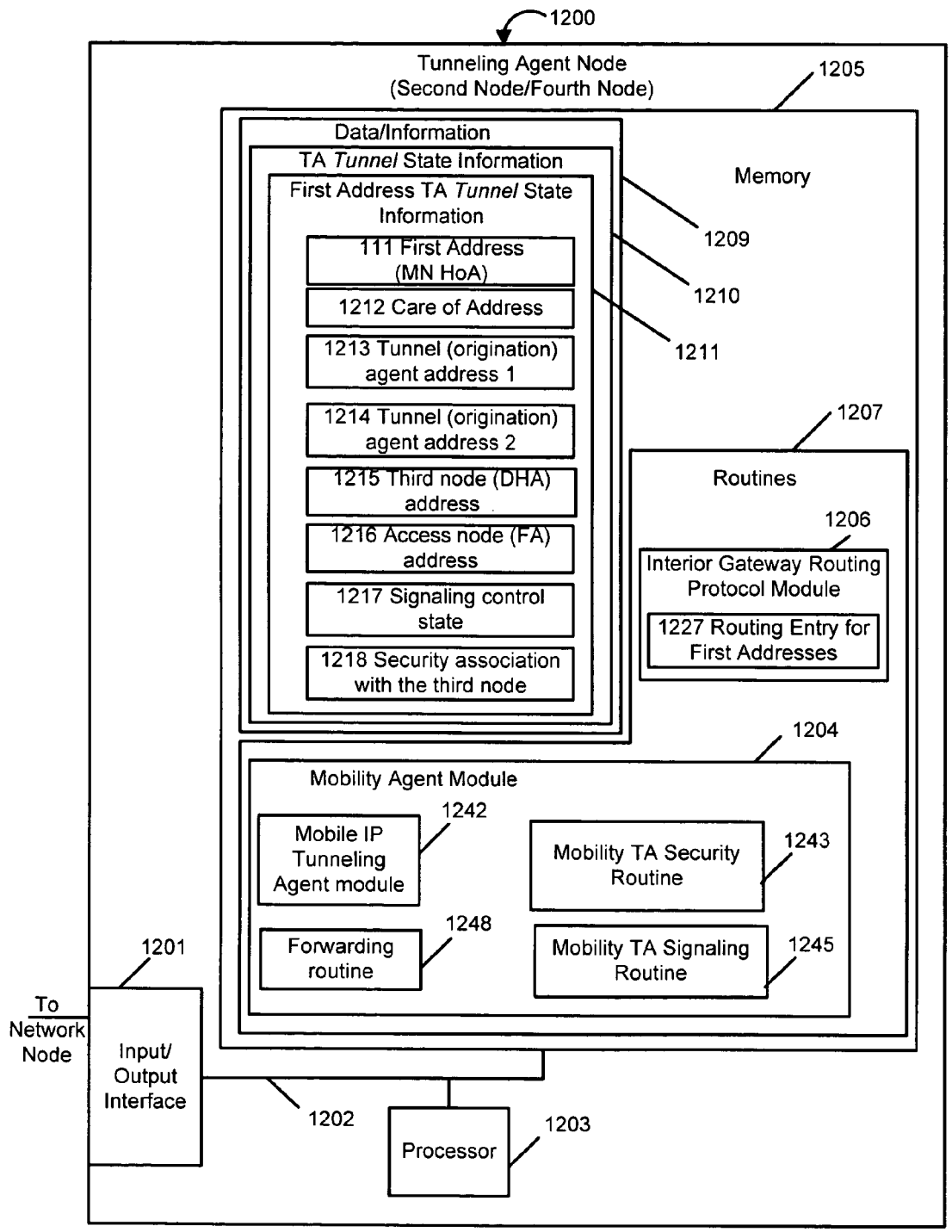
FIG. 12 illustrates an exemplary tunneling agent node, e.g., a core network node used to forward/redirect data packets to a MN, implemented in accordance with the present invention and using methods of the present invention.

FIG. 12 shows an exemplary tunneling agent node 1200 implemented in accordance with the present invention. Exemplary tunneling agent node 1200 may be second node (TA1) 120 or fourth node (TA2) 140 of exemplary system 100 of FIG. 1. The tunnel agent node 1200 includes input/output interface 1201 coupling the tunnel agent to another network node, a communications bus 1202 coupling the input/output interface 1201 to a processor 1203 and a memory 1205. The memory 1205 includes routines 1207 and data/information 1209. Processor 1203, e.g., a CPU, executes the routines 1207 and uses the data/information 1209 in memory 1205 to control the operation of the tunneling agent node 1200 and to implement methods of the present invention. Routines 1207, e.g., program instructions to be executed on processor 1203, include a mobility agent module 1204. Mobility agent module 1204 includes a mobile IP tunnel agent module 1242, a mobility tunnel agent signaling routine 1245 used to send mobility messages to other mobility nodes, a mobility tunnel agent security routine 1243 for securing such messages, and a forwarding routine 1248 used to forward redirected packets to and from the tunnel endpoint node 110,124. The mobile IP TA module 1242 coordinates the signaling 1245, security 1243 and forwarding 1248 routines to support the mobility of a mobile node 110. The routines 1207 in memory 1205 further includes a Interior Gateway Routing Protocol Module 1206 with a routing entry 1227 for the first address 111 of the MN 110, the routing protocol model 1206 advertising the first address routing entry 1227 into the interior gateway routing of the coupled network nodes 116,126 to enable the network nodes 116,126 to determine a routing metric back for reaching the first address via the tunnel agent 1200 (120,140). The data/information 1209 in memory 1205 includes TA Tunnel state information 1210. TA Tunnel state information 1210 includes TA Tunnel state information 1211 associated with the first home address of the MN 110. In general, TA 1200 will service multiple MNs, and TA Tunnel State information

1210 will include a plurality of sets of tunnel state information. State Information 1211 includes the first address 111; the Care of Address 1212 of the MN 110 which is an address of the tunnel endpoint node 110,124; the address 1213 of the first tunnel agent 120; the address 1214 of the second optional tunnel agent 140; the address 1215 of the third node (DHA) 130; the address 1216 of the access node (FA) 124; signaling control state 1217 indicating which type of signaling sequence the tunnel agent 1200 uses to perform mobility management with the third node 130; and a security association 1218 with the third node 130 used to secure such signaling. The state information shows that the tunnel agent addresses 1213, 1214 are always different from the address 1215 of the third node 130. The tunnel agent 1200 (120,140) will forward and receive redirected packets with the tunnel endpoint node identified by the CoA 1212. The tunnel agent 1200 (120,140) will in contrast exchange mobility signaling messages with the address 1215 of the third node 130, using either messages 366,367 or 374,375 or 466,467 or 474,475. The signaling control state 1217 controls which of the above signaling methods are to be employed for the first address 111. The second node 120 further knows the address 1214 of the fourth node 140 with which it is acting to support redirected packets for the first address 111. This enables communications between the second and fourth nodes 120,140 that may be used to synchronize state in the second and fourth nodes that is not otherwise communicated from the tunnel endpoint node (110,124) or the third node 130. This provides a way to improve the resilience or performance of the packet redirection under failure conditions at one of the second or fourth node 120,140.

Figures 13, 13A:
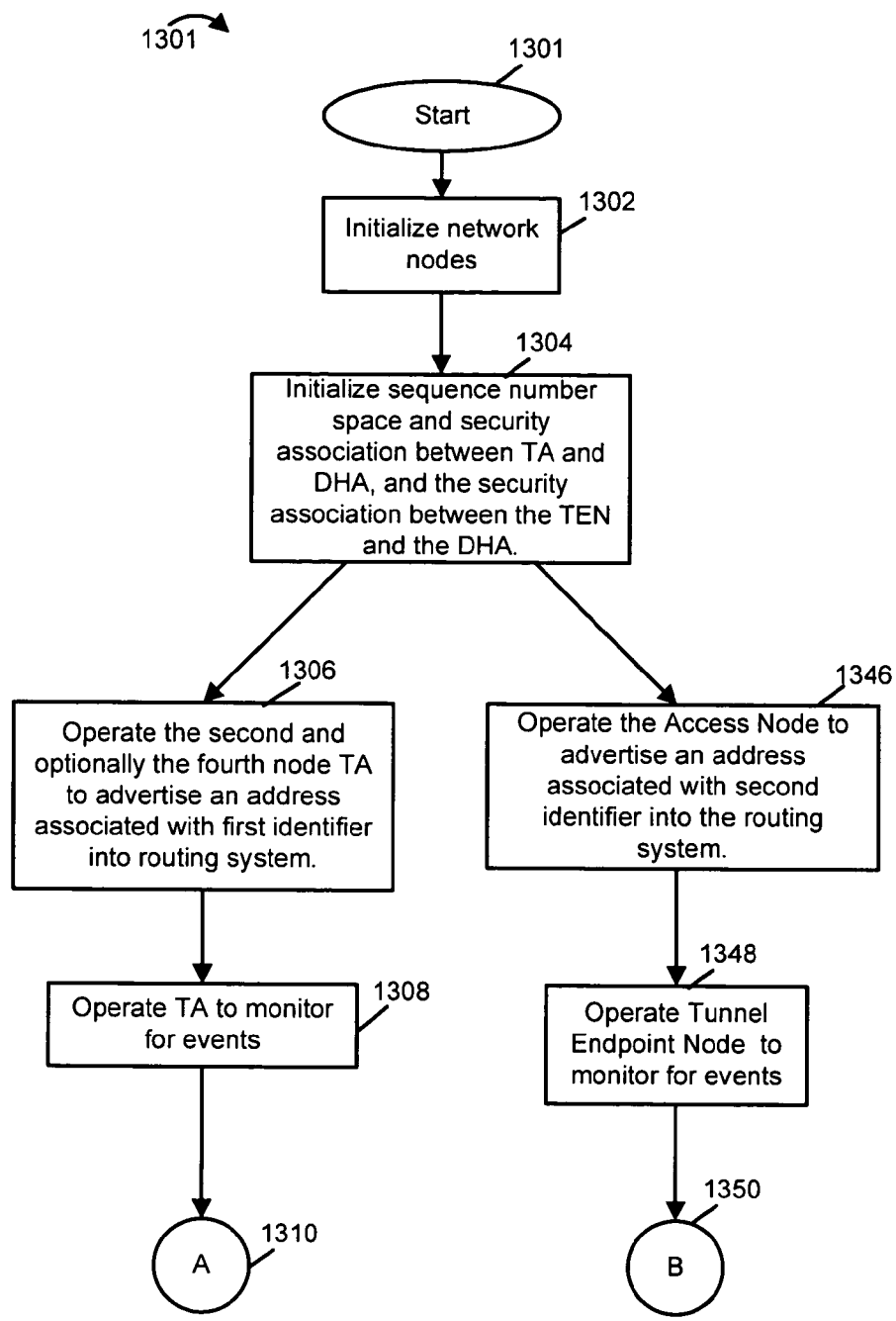
FIG. 13, which comprises the combination of FIGS. 13A, 13B, 13C, 13D, and 13E, is a flowchart illustrating an exemplary communications method that is performed in accordance with the present invention.
Figure 13B:
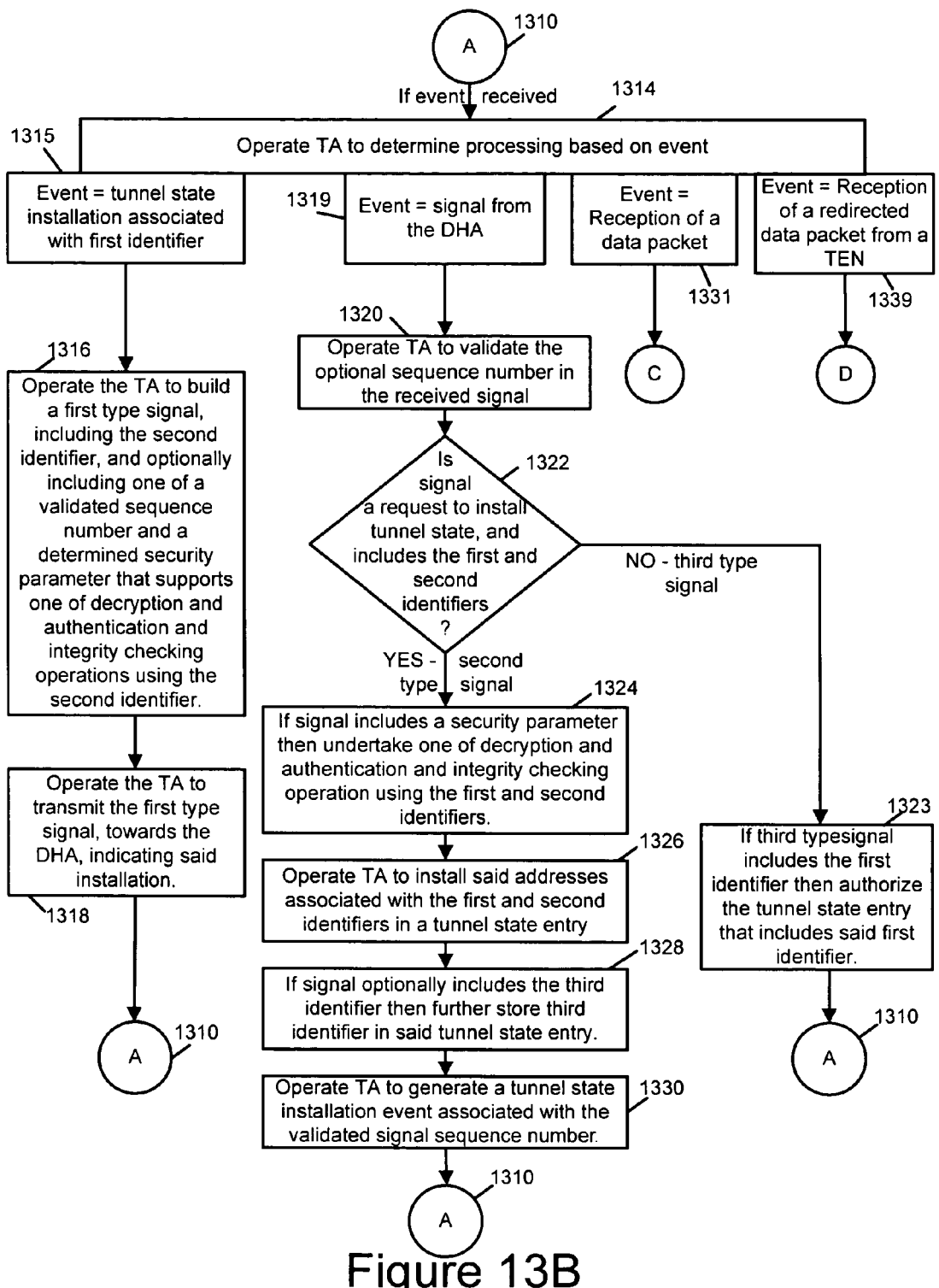
Figure 13C:
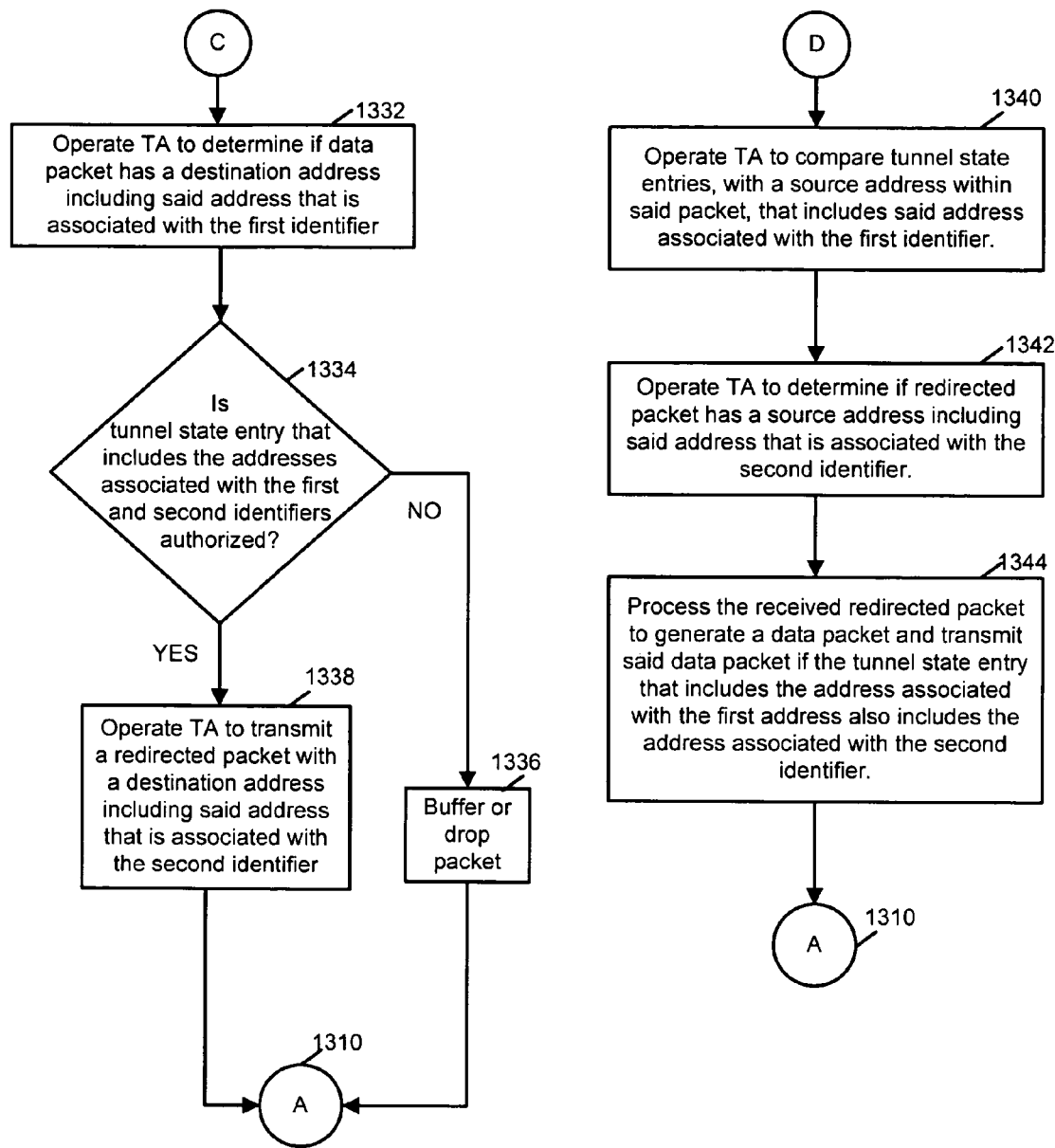
Figure 13D:
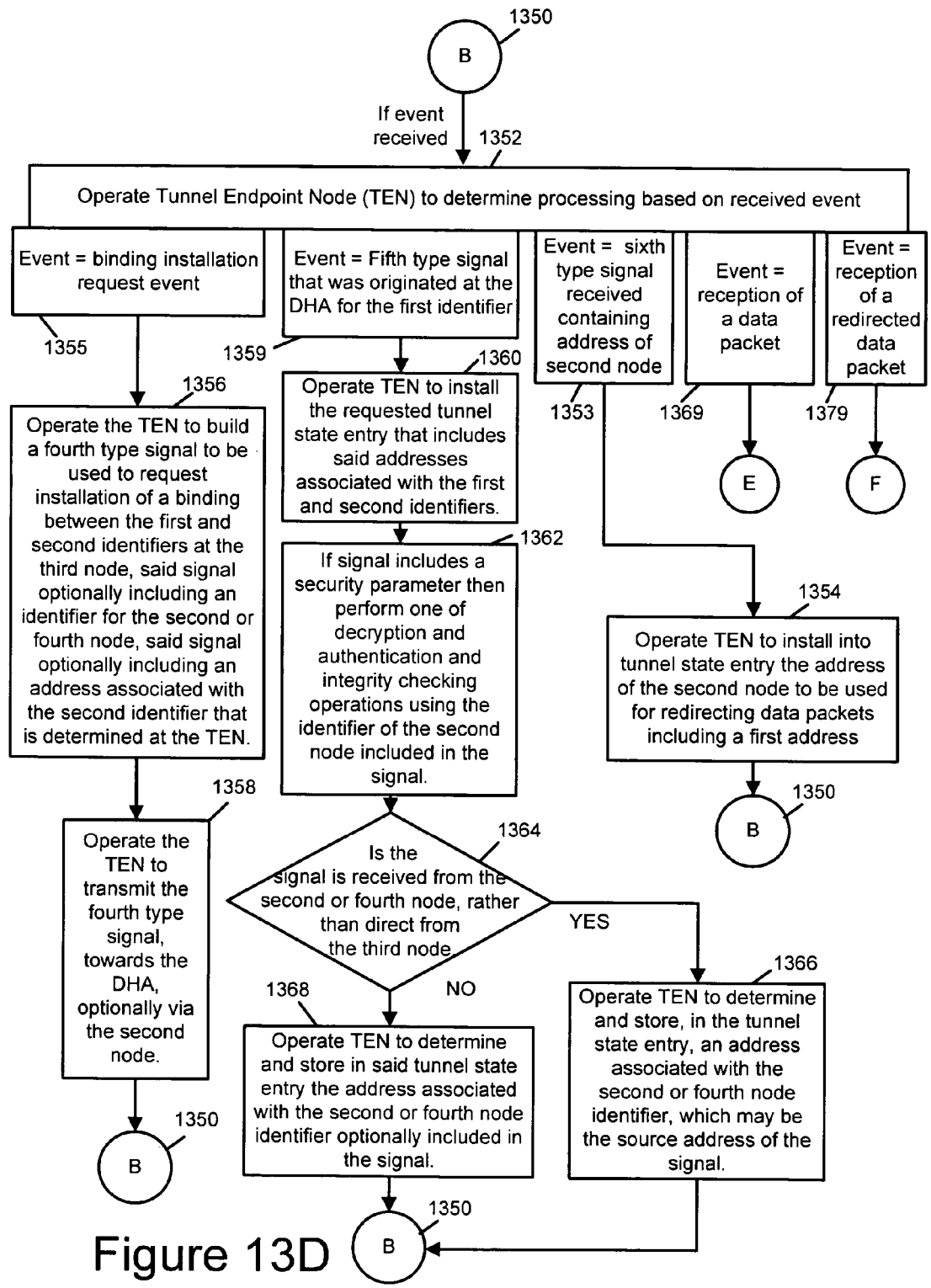
Figure 13E:
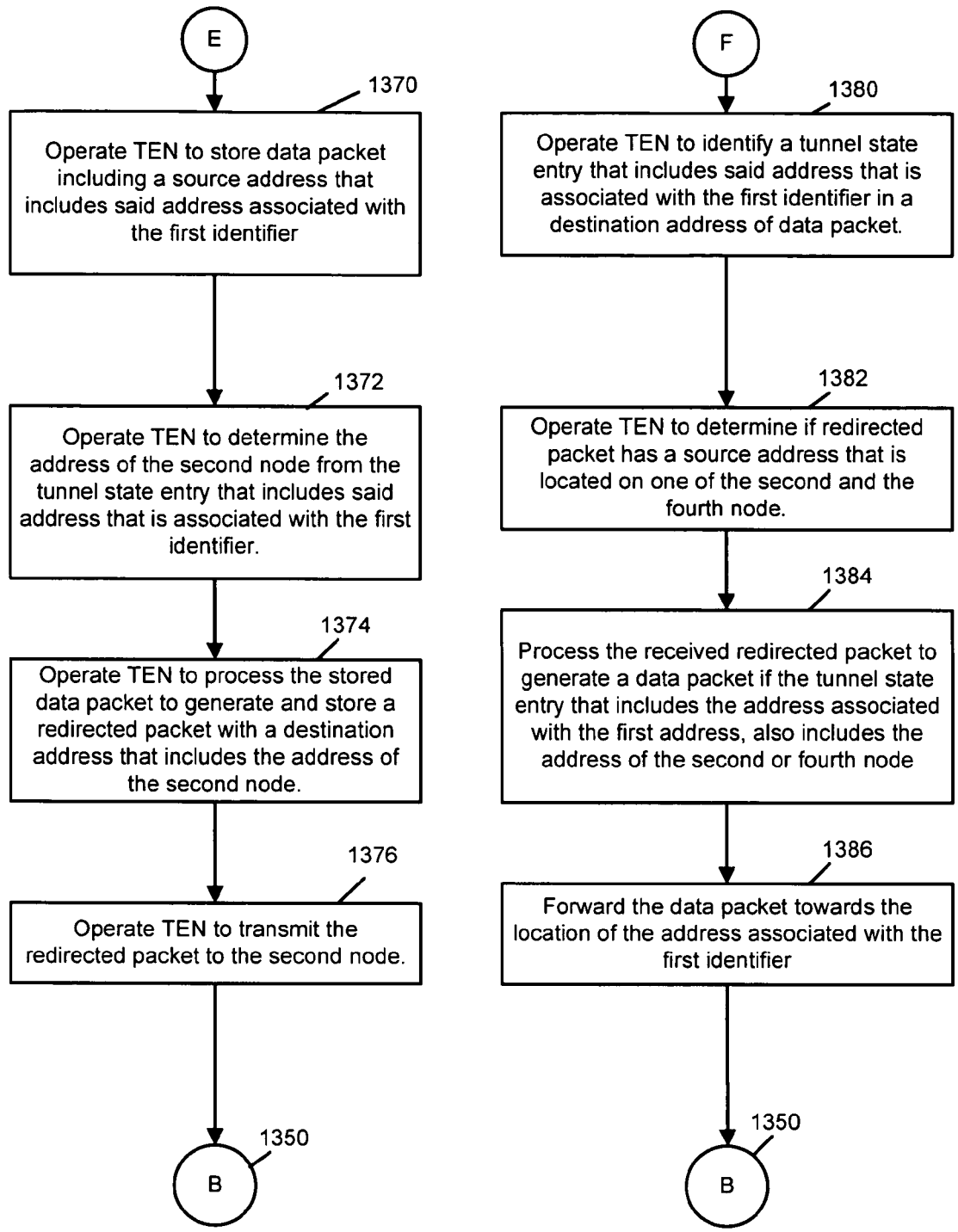

FIG. 13 comprises the combination of FIG. 13A, FIG. 13B, FIG. 13C, FIG. 13D, and FIG. 13E. FIG. 13 is a flowchart 1300 illustrating an exemplary communications method that is performed in accordance with the present invention, wherein the nodes of the exemplary communications system are operated using methods in accordance with the present invention. The method starts at step 1301 and initializes network nodes at step 1302. In step 1304 a sequence number space that is to be used to match signal requests with responses between the TA (120,140) and the third node 130 (DHA) is initialized, along with a security association that is to be used to secure messages between the TA and the DHA, and a security association that is to be used to secure messages between the TA and the first node 110 or the access node 124, whichever is the tunnel endpoint node (TEN). The TEN is the node that is assigned the Care of Address and hence which terminates the tunnel with the TA. Operation proceeds from step 1304 to steps 1306 and steps 1346.

In step 1346 the access node 124 advertises a route into the routing system, for an address that is associated with a second identifier, so establishing that packets destined for said address associated with the second identifier, will be directed to the TEN. Said address associated with the second identifier, and said second identifier, may for example be the Care of Address of the first node 110 and the identity of the TEN, where without loss of generality, the second identifier can be equal to the Care of Address. Said second identifier may be an identifier associated with the access node 124 such as, e.g., a Fully Qualified Domain Name (FQDN), a Network Access Identifier (NAI), or a private access node identifier assigned by the operator.

At step 1306, the TA in the second node 120 and/or the fourth node 140, advertises a route into the routing system for an address that is associated with a first identifier into the routing system, so establishing that packets destined for said address associated with the first identifier, will be directed to one of either the second or fourth nodes 120,140. The first identifier can be an identifier of the first node 110 such as a Network Access Identifier (NAI), a Fully Qualified Domain Name (FDQN), a SIP Universal Resource Identifier (URI), an identifier derived from an International Mobile Subscriber Identity (IMSI), or a globally unique end node identifier, whilst the first identifier can without loss of generality alternatively be the first address 111. The address associated with the first identifier is the first address 111 in either case. Operation proceeds from step 1306 to step 1308. In step 1308 the TA is operated to monitor for events and then progresses to node A 1310 to wait for such events. When an event is detected then the method progresses to step 1314 where the TA is operated to determine the processing based on the determined event. If the event is the installation of tunnel state in the TA that is associated with the first identifier (of the first node 110), event 1315, then the method progresses to step 1316 where the TA is operated to build a first type signal that includes the second identifier (of the TEN), and optionally including one of a valid sequence number that is used for matching request to reply at another node, and a determined security parameter that supports one of a decryption, authentication and integrity checking operation using the second identifier at another node. Exemplary first type signals include messages 367, 375, and 466. Operation proceeds from step 1316 to step 1318. In step 1318, the first type signal is then transmitted towards the third node 130 that acts as the DHA, so that the DHA is informed of said installation of tunnel state in the TA, and the method then returns to node A 1310 to wait for another event.

Returning to step 1314, if the event is a signal from the third node 130 (DHA), event 1319, then in step 1320, the TA is operated to validate the optional sequence number in the signal by ensuring it is not less than a previous received sequence number, and/or that it matches a sequence number previously transmitted to the third node 130 by the second node 120. If the sequence number is validated, then the method progresses to step 1322 where the signal is checked to determine if the received signal is a second type signal, where the second type signal is a request to install tunnel state into the second node 120 and that it includes the first and second identifiers (of the first node 110, and the TEN that is assigned the Care of Address of the first node 110). Exemplary second type signals include messages 366, 374. If the signal is not a request to install tunnel state, then it is a third type signal, an installation authorization, and the method progresses to step 1323 where the received third type signal is checked to see if the signal includes the first identifier, and if so then the tunnel state entry that includes said first identifier (of the first node 110) is authorized such that it can be used for forwarding packets at the TA. Exemplary third type signals include signal 467.

Alternatively, if step 1322 is affirmative, then the received signal is the second type signal and the method moves to step 1324 where one of a decryption, authentication and integrity checking operation is performed using the first and second identifiers from the received second type signal, if the received second type signal includes a security parameter. The method then moves to step 1326 where the TA operates to install the addresses associated with the first and second identifiers into a tunnel state entry at the TA. Operation proceeds from step 1326 to step 1328. At step 1328, if the received second type signal includes a third identifier which is the identifier of the fourth node 140, which is acting in concert with the second node 120 as a TA, then the third identifier, which may without loss of generality be an address of the fourth node 140, is stored in said tunnel state entry that is associated with the first and second identifiers. The method then progresses to step 1330 where the TA is operated to generate a tunnel state installation event that is associated with the validated sequence number of the received second signal and hence is associated with the tunnel state entry that includes the addresses associated with the first and second identifiers. The method then moves to node A 1310 where said tunnel state installation event (generated in step 1330) will be detected and processed.

Returning to step 1314, if the event is the reception of a data packet at the TA from the Correspondent Node 150, event 1331, then the method moves to step 1332, via connecting node C, where the TA is operated to determine if the received data has a destination address that includes the address that is associated with the first identifier. If it does, then at step 1334 the TA is operated to determine if the tunnel state entry that includes the addresses associated with the first and second identifiers is authorized for packet forwarding. If not, then at step 1336, the received data packet is one of dropped and buffered until the tunnel state entry is authorized, before the method moves to node A 1310. However, if the tunnel state entry at step 1334 is authorized then in step 1338 the TA is operated to transmit a redirected packet towards a destination address that includes the address that is associated with the second identifier (the TEN), said redirected packet being produced by processing the received data packet. The method then returns to node A 1310.

Returning to step 1314, if the event is the reception of a redirected packet from a TEN, event 1339, then the method moves to step 1340 via connecting node D. In step 1340, the TA is operated to compare a source address within the redirected packet (such as the inner source address of a tunneled packet), to the tunnel state entries to identify the state entry that includes the address associated with the first identifier that is included in said source address. In step 1342, the TA is then operated to determine if the redirected packet has a source address (such as the outer source address of the tunnel packet) that includes the address that is associated with the second identifier, so establishing that the packet was redirected from the correct TEN, that is identified in the tunnel state entry associated with the first identifier. In step 1344, the redirected packet is then processed to recover the data packet (i.e., through tunnel decapsulation) from the received redirected packet that is directed from the first node 110 towards the Correspondent Node 150, and to transmit the data packet towards the CN 150 if the redirected packet was received from the correct TEN. The method then returns to node A 1310 to await further events at the TA.

From step 1346, operation proceeds to step 1348. In step 1348, the tunnel endpoint node also monitors for events and waits at node B 1350 for such events. The method of operating the Tunnel endpoint Node (TEN) will be described, wherein the TEN can be either one of the access node 124 or the first node 110 depending on whether a Foreign Agent or Colocated CoA is employed. Starting at node B 1350, when an event is detected by the TEN, operation proceeds to step 1352 where the TEN is operated to determine the required processing based on the received event type. If the event is a binding installation request event 1355 then the method moves to step 1356 where the TEN is operated to build a fourth type signal to be used to request installation of a binding between the first and second identifiers at the third node 130 (DHA), said fourth type signal optionally including an identifier for the second and/or fourth node 120,140 to be used to route the fourth type signal via the second and fourth nodes 120,140, said fourth type signal further optionally including an address associated with the second identifier that is determined at the TEN. Exemplary fourth type signals include messages 361, 370, and 461. The method then moves to step 1358 where the TEN is operated to transmit the fourth type signal towards the third node 130 (DHA), optionally via the second node 120. Operation proceeds from step 1358 to node B 1350 until an event is detected.

Returning to step 1352, if the received event is the reception of a fifth type signal that includes the first identifier, and that was originated at the third node 130 (DHA) but which may optionally be received via the second node 120, event 1359, the method moves to step 1360. In such a case, the third node (DHA) is the original source of the fifth type signal although it may be forwarded through one or more intermediate nodes. Exemplary fifth type signals include messages 362, 371, 462. In step 1360, the TEN is operated to install the requested tunnel state entry that includes the addresses associated with the first and second identifiers, where said second identifier is optionally included in the second signal. The method then moves to step 1362 where if the fifth type signal includes a security parameter then the TEN is operated to perform one of a decryption and authentication and integrity checking operation using the identifier of the second node 120 that is included in the signal, wherein said second node identifier could be the address or an NAI of the second node 120 for example. Next in step 1364 the TEN is operated to determine whether the fifth type signal is received from the second or fourth node 120,140 rather than direct from the third node 130 (DHA). If this is the case then in step 1366 the TEN is operated to determine and store, in the tunnel state entry created for the second signal in step 1360, an address associated with the second node identifier which may be the source address of the fifth type signal. If this is not the case in step 1364, then the method moves to step 1368 where the TEN is operated to determine and store, in said tunnel state entry from step 1360, the address associated with the second or fourth node identifier that is optionally included in the signal. The method in either case (step 1366 or step 1368) then returns to node B 1350.

Returning to step 1352, if the event is a sixth type signal being received which contains the address of the second node, event 1353, then the method moves to step 1354 where the TEN is operated to install into tunnel state entry the address of the second node to be used for redirecting data packets including a first address, and for redirecting the fourth type signal that is destined for the third node 130, via the second node 120. Exemplary sixth type signals include messages 476, 477, 478, and 479. The method then moves to node B 1350.

Returning to step 1352, if the event is the reception of a data packet from the first node 110 (MN) towards the fifth node 150 (CN), with a source address equal to the first address 111 and a destination address equal to the second address 151, event 1369, then the method moves to step 1370 via connecting node E. In step 1370 the TEN is operated to store the data packet including a source address that includes said address that is associated with the first identifier (i.e., the first address 111). Next, in step 1372, the TEN is operated to determine the address of the second node from the tunnel state entry that includes said address that is associated with the first identifier. Next, in step 1374, the TEN is operated to process the stored data packet to generate and a store a redirected packet with a destination address that includes the address of the second node 120. The method then moves to step 1376 where the TEN is operated to transmit the redirected packet to the second node 120 before the method returns to node B 1350.

Returning to step 1352, if the event is the reception of a redirected data packet, event 1379, which for example could be transmitted by either the second or fourth nodes 120,140, then the method moves to step 1380, via connecting node F, where the TEN is operated to identify a tunnel state entry that includes said address that is associated with the first identifier (first address 111) that is within a destination address of the redirected packet. The method then moves to step 1382 where the TEN is operated to determine if the redirected packet has a source address that is located on one of the second and fourth nodes 120,140. Next, in step 1384, the TEN is operated to process the received redirected packet to generate a data packet (i.e., by decapsulation from a tunnel) if the tunnel state entry identified in step 1380 that includes the address associated with the first address, also includes the address of the second or the fourth node 120, 140. Next, in step 1386, the data packet from step 1384 is transmitted towards the location of the address associated with the first identifier which is the location of the first node 110, and the method then returns to node B 1350 to await further events.

The invention supports methods other than IP in IP tunnels for packet redirection between the second node 120 and the tunnel endpoint node (110 or 124); said methods including for example, IPv6 (Internet Protocol Version 6) routing headers, GRE (Generic Routing Encapsulation) tunnels, IPSEC tunnels, as well as VPN (Virtual Private Network) techniques such as MPLS (Multi Protocol Label Switching) and switched circuits.

Whilst the invention has been described for exemplary MIP mobility RREQ/RREP signaling, the invention is applicable to other signaling protocols which requests that a third node 130 should establish a tunnel, or support other such packet redirection mechanism, between the third node 130 and a tunnel endpoint node 110,124 such that the third node 130 tunnel establishment and control functionality is decomposed from data packet forwarding functionality so that the tunnel agent used to forward data packets is located in a second node 120, whilst information about the tunnel origination point is returned to the tunnel endpoint node 110,124 using the signaling from the third node 130.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s). Messages which are generated and/or transmitted in accordance with the invention are stored on machine readable medium, e.g., in memory (RAM) in the device generating, transmitting and/or receiving the message or messages. The present invention is directed to, among other things, memory storing the novel messages of the present invention.

Numerous additional variations on the methods and apparatus of the present invention described above will be apparent to those skilled in the art in view of the above description of the invention. Such variations are to be considered within the scope of the invention. The methods and apparatus of the present invention may be used with CDMA, orthogonal frequency division multiplexing (OFDM), or various other types of communications techniques which may be used to provide wireless communications links between access nodes such as base stations and mobile nodes. Accordingly, in some embodiments base stations establish communications links with mobile nodes using OFDM or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of supporting mobility in a communications system, the system including a mobile node, a routing control node, a data packet forwarding node and an access node, said access node serving as the mobile nodes point of attachment to the network via a wireless link, the method comprising:
    operating the routing control node to receive a forwarding control message, said forwarding control message being communicated from the mobile node to the routing control node via said access node, said forwarding control message being forwarded to said routing control node over a control path which does not traverse said data packet forwarding node;
    operating the routing control node to establish a data packet forwarding path between the data packet forwarding node and one of said access node and mobile node, said routing control node being outside said data packet forwarding path;
    operating the routing control node to transmit a response message to said mobile node indicating establishment of said data packet forwarding path;
    operating the data packet forwarding node to transmit a routing advertisement for an address associated with a first identifier;
    operating said access node to transmit a routing advertisement for an address associated with a second identifier, wherein said forwarding control message to the routing control node includes a request for installation in a table in said routing control node of a tunnel state entry associating the first and second identifiers; and operating the data packet forwarding node to redirect packets comprising:
    operating the data packet forwarding node to receive a redirected packet from the one of the mobile node and access node acting as a tunnel endpoint node, said redirected packet including a source address that includes said address associated with the second identifier;
    operating the data packet forwarding node to compare an additional source address included in the received redirected packet to tunnel state entries stored at the data packet forwarding node, wherein said additional source address includes said address associated with the first identifier; and
    operating the data packet forwarding node to compare to verify that the tunnel state entry that includes said address associated with first identifier maps said address associated with the first identifier to said address associated with the second identifier.

2. The method of claim 1, wherein said mobile node has a home address associated with said data packet forwarding node, packets intended for said mobile node including said home address being routed to said data packet forwarding node, the method further comprising:
    operating the data packet forwarding node to redirect packets including said home address of said mobile node along said established data packet forwarding path.

3. The method of claim 1, further comprising:
    operating the data packet forwarding node to transmit a signal to the routing control node indicating installation of a tunnel state entry for the packet forwarding path.

4. The method of claim 1,
wherein said forwarding control message and said response message are IP signals used for mobility signaling;
wherein the first identifier is a home address (HoA) of the mobile node;
wherein the routing control node is a Home Agent which performs packet routing control functions used to support mobile node mobility;
wherein the second identifier is one of a Colocated Care of Address of said mobile node and a Care of Address of a mobility Agent located at said access node; and
wherein the data packet forwarding node is a Tunnel Agent.

5. The method of claim 1,
wherein the first identifier is one of the following identifiers associated with a mobile node: a fully qualified domain name (FDQN), a Network Access Identity (NAI), a SIP Universal Resource Identifier (URI), an identifier derived from an International Mobile Subscriber Identity (IMSI), a globally unique end node identifier; and
wherein the second identifier is one of the following identifiers associated with an access node: a FQDN, an NAI, and a private access node identifier assigned by the operator.

6. The method of claim 1, wherein said system further includes another data packet forwarding node and a third identifier being associated with said another data packet forwarding node, the method further comprising:
operating said another data packet forwarding node to transmit an additional routing advertisement for the address associated with the first identifier;
operating the data packet forwarding node to receive a signal further indicating the third identifier; and
operating said data packet forwarding node to store said third identifier and associate it with a tunnel state entry for the first and second identifiers.

7. The method of claim 1, wherein the data packet forwarding node includes a security routine and a security association that is also known to the routing control node, the method further comprising:
operating the data packet forwarding node to determine a security parameter to be included in a first signal to be transmitted to the routing control node, using the second identifier included in said transmitted signal; and
wherein said security parameter is used by the routing control node to perform one of a decryption operation, an authentication operation and an integrity checking operation using the second identifier included in said first signal transmitted from the data packet forwarding node to the routing control node.

8. The method of claim 4, further comprising:
operating the mobile node to notify the routing control node when it changes the access node to which it is attached to a new access node.

9. The method of claim 8, further comprising:
operating the routing control node to direct packet including said Home Address of said mobile node to said new access node, at least some of said directed packets including data corresponding to a communications session between said mobile node and another mobile node, said data being one of voice and text data.

10. A method of supporting mobility in a communications system, the system including a mobile node, a routing control node, a data packet forwarding node and an access node, said access node serving as the mobile nodes point of attachment to the network via a wireless link, the method comprising:
operating the routing control node to receive a forwarding control message, said forwarding control message being communicated from the mobile node to the routing control node via said access node, said forwarding control message being forwarded to said routing control node over a control path which does not traverse said data packet forwarding node;
operating the routing control node to establish a data packet forwarding path between the data packet forwarding node and one of said access node and mobile node, said routing control node being outside said data packet forwarding path;
operating the routing control node to transmit a response message to said mobile node indicating establishment of said data packet forwarding path;
operating the data packet forwarding node to transmit a routing advertisement for an address associated with a first identifier;
operating said access node to transmit a routing advertisement for an address associated with a second identifier, wherein said forwarding control message to the routing control node includes a request for installation in a table in said routing control node of a tunnel state entry associating the first and second identifiers;
operating the routing control node to transmit a first signal to the data packet forwarding node, said first signal requesting the installation of a tunnel state entry in the packet forwarding node, said first signal including the first and second identifiers;
operating the data packet forwarding node to receive the first signal from the routing control node;
operating the data packet forwarding node to install said address associated with the first identifier and said address associated with the second identifier in a tunnel state entry in the data packet forwarding node;
operating the data packet forwarding node to transmit a second signal toward the routing control node, said second signal indicating installation of the tunnel state entry in the data packet forwarding node associated with the first identifier; and
wherein said step of transmitting the second signal toward the routing control node follows the successful installation of the tunnel state entry in the data packet forwarding node.

11. The method of claim 10, wherein said mobile node has a home address associated with said data packet forwarding node, packets intended for said mobile node including said home address being routed to said data packet forwarding node, the method further comprising:
operating the data packet forwarding node to redirect packets including said home address of said mobile node along said established data packet forwarding path.

12. The method of claim 10, further comprising:
operating the data packet forwarding node to transmit a signal to the routing control node indicating installation of a tunnel state entry for the packet forwarding path.

13. The method of claim 10,
wherein said forwarding control message and said response message are IP signals used for mobility signaling;
wherein the first identifier is a home address (HoA) of the mobile node;
wherein the routing control node is a Home Agent which performs packet routing control functions used to support mobile node mobility;

wherein the second identifier is one of a Colocated Care of Address of said mobile node and a Care of Address of a mobility Agent located at said access node; and wherein the data packet forwarding node is a Tunnel Agent.

14. The method of claim 10, wherein the first identifier is one of the following identifiers associated with a mobile node: a fully qualified domain name (FDQN), a Network Access Identity (NAI), a SIP Universal Resource Identifier (URI), an identifier derived from an International Mobile Subscriber Identity (IMSI), a globally unique end node identifier; and wherein the second identifier is one of the following identifiers associated with an access node: a FQDN, an NAI, and a private access node identifier assigned by the operator.

15. The method of claim 10, wherein said system further includes another data packet forwarding node and a third identifier being associated with said another data packet forwarding node, the method further comprising:

operating said another data packet forwarding node to transmit an additional routing advertisement for the address associated with the first identifier;

operating the data packet forwarding node to receive a signal further indicating the third identifier; and operating said data packet forwarding node to store said third identifier and associate it with a tunnel state entry for the first and second identifiers.

16. The method of claim 10, wherein the data packet forwarding node includes a security routine and a security association that is also known to the routing control node, the method further comprising:

operating the data packet forwarding node to determine a security parameter to be included in a first signal to be transmitted to the routing control node, using the second identifier included in said transmitted signal; and wherein said security parameter is used by the routing control node to perform one of a decryption operation, an authentication operation and an integrity checking operation using the second identifier included in said first signal transmitted from the data packet forwarding node to the routing control node.

17. The method of claim 13, further comprising:

operating the mobile node to notify the routing control node when it changes the access node to which it is attached to a new access node.

18. The method of claim 17, further comprising:

operating the routing control node to direct packet including said Home Address of said mobile node to said new access node, at least some of said directed packets including data corresponding to a communications session between said mobile node and another mobile node, said data being one of voice and text data.

19. A machine readable medium embodying computer executable instructions for controlling a tunneling agent node in a communications system including a mobile node, an access node, said tunneling agent node, and a routing control node, wherein one of said access node and the mobile node operates as a tunnel endpoint node, the machine readable medium comprising:

instructions for causing the tunneling agent node to generate and send a routing advertisement for an address associated with a first identifier, said tunneling agent node including tunnel state entries that map between an addresses associated with the first identifier and address associated with a second identifier;

instructions for causing the tunneling agent node to generate and send a first signal towards the routing control node indicating installation of a tunnel state entry associated with the first identifier, said first signal including the second identifier;

instructions for causing the tunneling agent node to receive a data packet including a destination address that includes said address associated with the first identifier;

instructions for causing the tunneling agent node to redirect said received data packet, said redirected packet being modified by said tunneling agent node to add a destination address that includes said address associated with the second identifier instructions for causing the tunneling agent node to receive a redirected packet from the tunnel endpoint node, said redirected packet including a source address that includes said address associated with the second identifier;

instructions for causing the tunneling agent node to compare an additional source address included in the received redirected packet to tunnel state entries stored at the second node, wherein said additional source address includes said address associated with the first identifier; and instructions for causing the tunneling agent node to verify that the tunnel state entry that includes said address associated with the first identifier maps said address associated with the first identifier to said address associated with said second identifier.

* * * * *

UNITED STATES PATENT AND TRADEMARK OFFICE
CERTIFICATE OF CORRECTION

PATENT NO. : 7,697,501 B2  
APPLICATION NO. : 10/838613  
DATED : April 13, 2010  
INVENTOR(S) : O'Neill Page 1 of 1

It is certified that error appears in the above-identified patent and that said Letters Patent is hereby corrected as shown below:

Column 22, line 12, claim 01: "the network" to read as --a network--

Column 23, line 17, claim 05: "FDQN" to read as --FQDN--

Column 23, line 66, claim 10: "mobile nodes" to read as --mobile node's--

Column 23, line 67, claim 10: "the network" to read as --a network--

Column 25, line 08, claim 14: "FDQN" to read as --FQDN--

Column 25, line 33, claim 16: "a first signal" to read as --the first signal--

Signed and Sealed this  
Twenty-fourth Day of July, 2012

David J. Kappos  
*Director of the United States Patent and Trademark Office*